(12) United States Patent
Lilleland et al.

(10) Patent No.: US 10,557,584 B2
(45) Date of Patent: Feb. 11, 2020

(54) MODULAR HEATER SYSTEMS

(71) Applicant: WATLOW ELECTRIC MANUFACTURING COMPANY, St. Louis, MO (US)

(72) Inventors: John Lilleland, Morgan Hill, CA (US); Terry Madson, Campbell, CA (US); Eric Ellis, Columbia, MO (US); Cristian Portillo, Columbia, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 371 days.

(21) Appl. No.: 15/381,280

(22) Filed: Dec. 16, 2016

(65) Prior Publication Data

US 2017/0238365 A1    Aug. 17, 2017

Related U.S. Application Data

(60) Provisional application No. 62/267,937, filed on Dec. 16, 2015.

(51) Int. Cl.
*F16L 53/38*    (2018.01)
*H05B 3/06*    (2006.01)
*H05B 3/10*    (2006.01)

(52) U.S. Cl.
CPC .......... *F16L 53/38* (2018.01); *H05B 3/06* (2013.01); *H05B 3/10* (2013.01); *H05B 2203/021* (2013.01)

(58) Field of Classification Search
CPC . F16L 53/38; F16L 53/30; F16L 53/32; F16L 53/35; F16L 53/37; H05B 3/06; H05B 3/10; H05B 3/08; H05B 3/16; H05B 3/18; H05B 3/22; H05B 3/26; H05B 3/28; H05B 2203/021
See application file for complete search history.

(56) References Cited

U.S. PATENT DOCUMENTS

| | | |
|---|---|---|
| 1,674,488 A | 6/1928 | Tang |
| 2,426,976 A | 9/1947 | Taulman |
| 2,809,268 A | 10/1957 | Heron |
| 3,296,415 A | 1/1967 | Eisler |
| 3,519,023 A | 7/1970 | Burns, Sr. et al. |
| 3,885,125 A | 5/1975 | Palm et al. |

(Continued)

FOREIGN PATENT DOCUMENTS

| | | |
|---|---|---|
| CH | 208911 | 3/1940 |
| CN | 2062106 | 9/1990 |

(Continued)

*Primary Examiner* — Shawntina T Fuqua
(74) *Attorney, Agent, or Firm* — Burris Law, PLLC

(57) ABSTRACT

A modular heater system includes a plurality of modular units aligned along a longitudinal direction of a fluid conduit for heating a fluid contained in the fluid conduit. The modular units each include a carrier member, a heating element mounted on the carrier member and a thermal insulation jacket surrounding the carrier member and the heating element. The carrier member defines a receiving space for receiving the fluid conduit therein and includes side slots recessed from outer surfaces of the carrier member. The thermal insulation jacket includes an upper half portion and a lower half portion. The upper half portion and the lower half portion are self-locked in the side slots of the carrier member.

10 Claims, 21 Drawing Sheets

(56) References Cited

U.S. PATENT DOCUMENTS

| | | |
|---|---|---|
| 4,123,837 A | 11/1978 | Horner |
| 4,152,577 A | 5/1979 | Leavines |
| 4,197,449 A | 4/1980 | Fessenden |
| 4,281,238 A | 7/1981 | Noma et al. |
| 4,293,763 A | 10/1981 | McMullan |
| 4,365,144 A | 12/1982 | Reich et al. |
| 4,429,213 A | 1/1984 | Mathieu |
| 4,575,617 A | 3/1986 | Cooper |
| 4,791,277 A | 12/1988 | Montierth et al. |
| 5,086,836 A | 2/1992 | Barth et al. |
| 5,286,952 A | 2/1994 | McMills et al. |
| 5,296,081 A | 3/1994 | Morin et al. |
| 5,359,179 A | 10/1994 | Desloge et al. |
| 5,537,742 A | 7/1996 | Le et al. |
| 5,632,919 A | 5/1997 | MacCracken et al. |
| 5,667,712 A | 9/1997 | Sutorius et al. |
| 5,714,738 A | 2/1998 | Hauschulz et al. |
| 5,756,972 A | 5/1998 | Vranicar et al. |
| 5,853,289 A | 12/1998 | Todd et al. |
| 5,974,227 A | 10/1999 | Schave |
| 6,049,658 A | 4/2000 | Schave et al. |
| 6,111,234 A | 8/2000 | Batliwalla et al. |
| 6,300,693 B1 | 10/2001 | Poag et al. |
| 7,034,254 B2 | 4/2006 | Grabowski et al. |
| 7,626,146 B2 | 12/2009 | Steinhauser et al. |
| 7,919,733 B2 * | 4/2011 | Ellis ................ H05B 3/50 219/544 |
| 7,964,826 B2 | 6/2011 | Ellis et al. |
| 8,809,751 B2 | 8/2014 | Ellis et al. |
| 2006/0278631 A1 | 12/2006 | Lee et al. |
| 2007/0108176 A1 | 5/2007 | Ellis et al. |
| 2008/0187300 A1* | 8/2008 | Scarzella ............ F16L 53/38 392/465 |
| 2009/0016707 A1 | 1/2009 | Steinhauser |
| 2013/0107908 A1 | 5/2013 | Lukach, Jr. |

FOREIGN PATENT DOCUMENTS

| | | |
|---|---|---|
| CN | 101283213 | 10/2008 |
| DE | 2511137 | 9/1976 |
| DE | 3544589 | 6/1987 |
| DE | 202005004602 | 7/2005 |
| EP | 0625669 | 11/1994 |
| EP | 0937565 | 8/1999 |
| FR | 2559874 | 8/1985 |
| FR | 2576662 | 8/1986 |
| FR | 2599115 | 11/1987 |
| JP | 55041646 | 3/1980 |
| JP | S5751770 | 3/1982 |
| JP | 8326983 | 12/1996 |
| JP | 10060958 | 3/1998 |
| JP | 200220827 | 1/2002 |
| JP | 2003148806 | 5/2003 |
| JP | 2007002986 | 1/2007 |
| JP | 2010503966 | 2/2010 |
| JP | 201154518 | 3/2011 |
| KR | 19990028880 | 2/2000 |
| KR | 1020020020827 | 4/2002 |
| KR | 100383030 | 7/2003 |
| SU | 761781 | 9/1980 |
| TW | 508421 | 11/2002 |
| TW | 240507 | 8/2004 |
| TW | M259878 | 3/2005 |
| WO | 9010817 | 9/1990 |
| WO | 9703540 | 1/1997 |
| WO | 0156731 | 8/2001 |
| WO | 2007019564 | 2/2007 |
| WO | 2008033927 | 3/2008 |

* cited by examiner

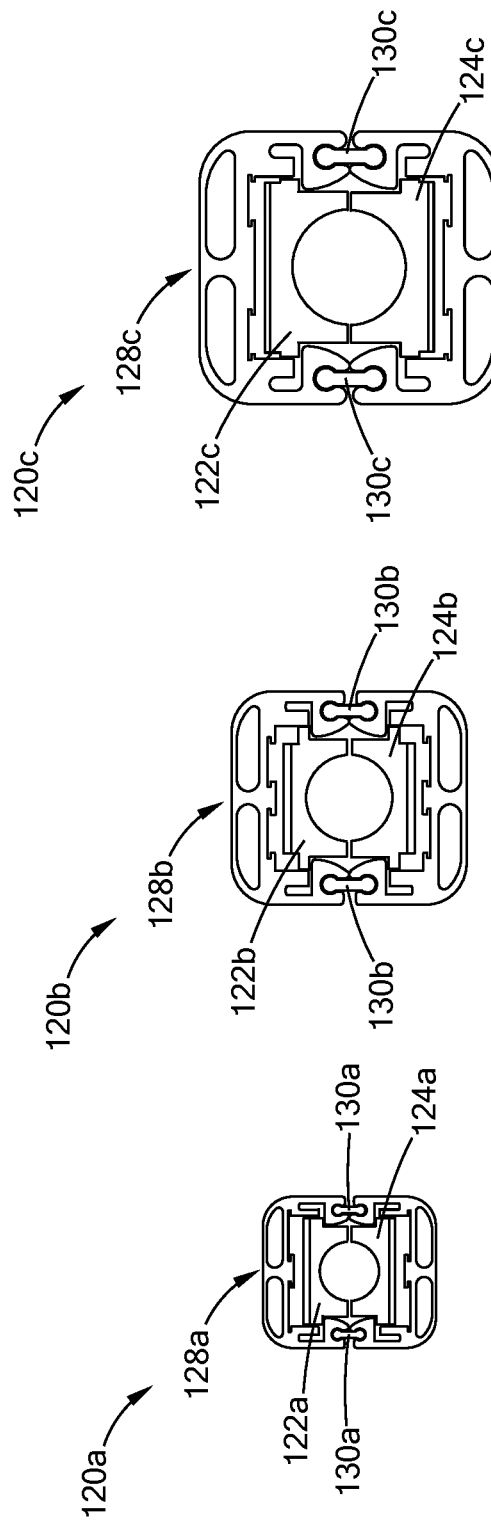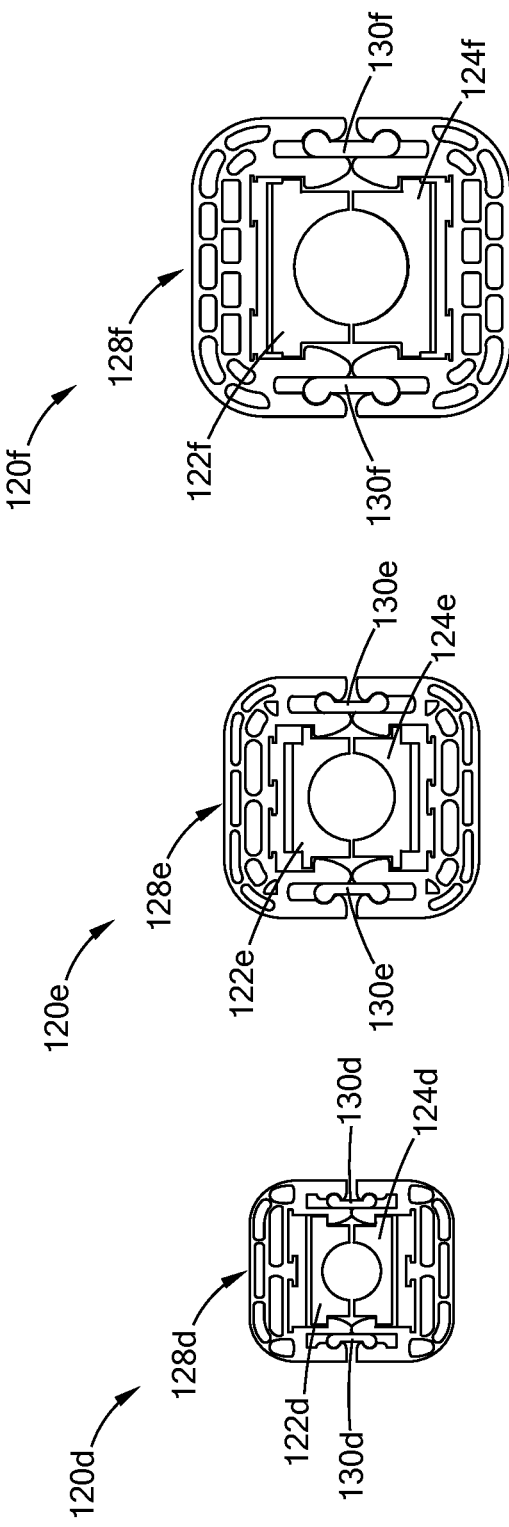

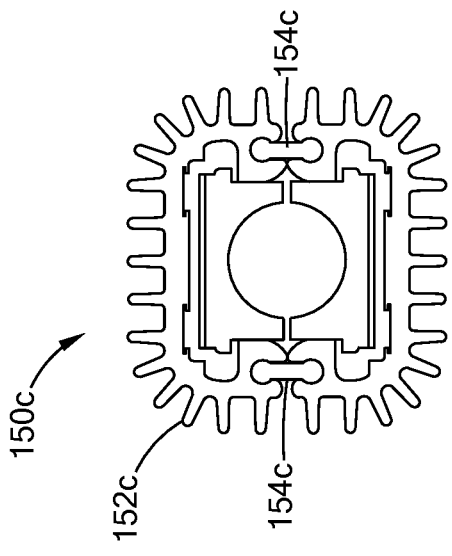
FIG. 13A
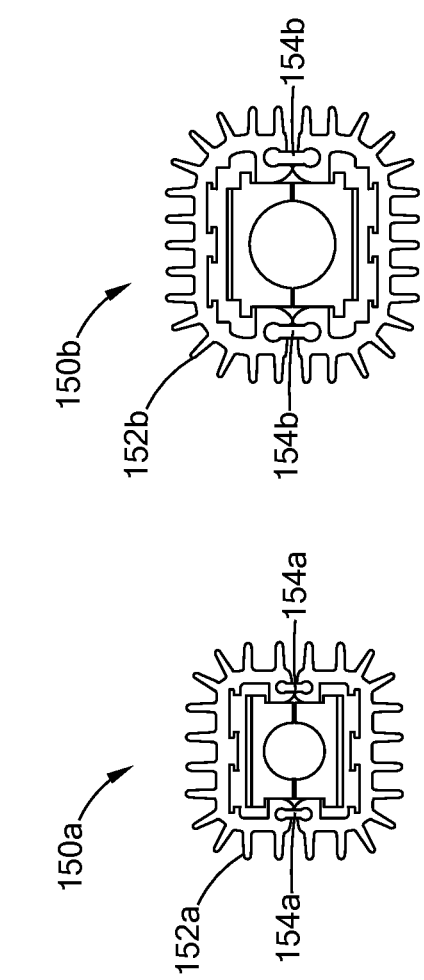
FIG. 13B
FIG. 13C
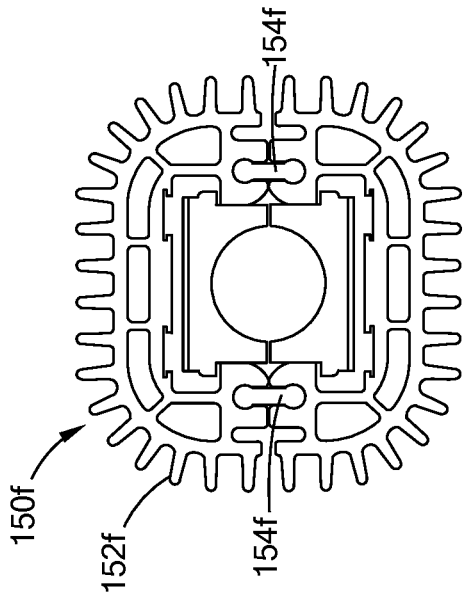
FIG. 13D
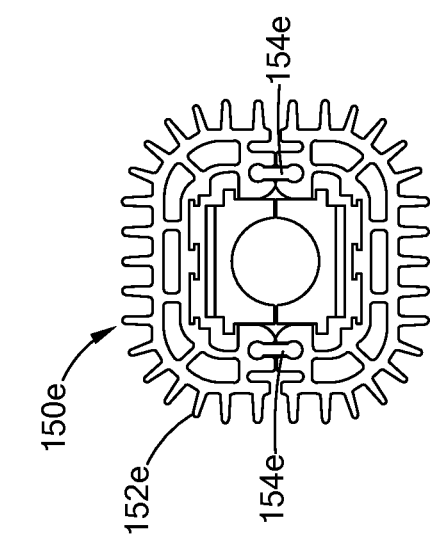
FIG. 13E
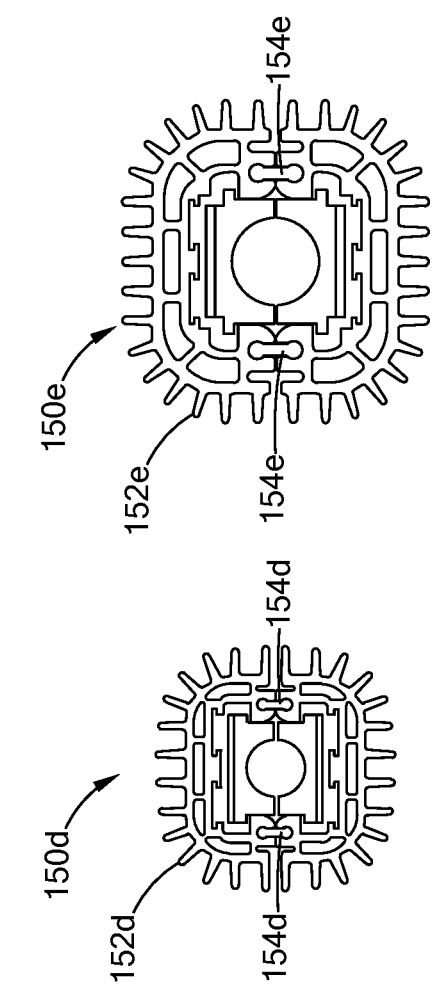
FIG. 13F

MODULAR HEATER SYSTEMS

CROSS-REFERENCE TO RELATED APPLICATIONS

This application claims priority to U.S. Provisional Application No. 62/267,937, titled "MODULAR HEATER SYSTEMS," and filed Dec. 16, 2015, the contents of which are incorporated herein by reference in its entirety.

FIELD

The present disclosure relates generally to electric heaters for use in pipelines, and more particularly to electric heaters for use in gaslines and pumplines such as, by way of example, semiconductor processing systems.

BACKGROUND

The statements in this section merely provide background information related to the present disclosure and may not constitute prior art.

The supply of fluids such as oil, gas, and water, among others, from a supply, e.g., an oil well or a water reservoir, requires transfer of such fluids by conduits or the like. Maintaining a free or unrestricted flow of the fluids within the conduits is often necessary, in addition to maintaining the fluid at or above a certain temperature. Presently, an electric heater in the form of a cable or a tape, known in the art as a "heat trace," is commonly used around the conduits to provide heat to the conduits and thus to the fluids. Additionally, the conduits and the heat traces are sometimes surrounded by a thermal insulation jacket to reduce heat loss to the surrounding environment.

Heat trace cables are a popular means for heating such fluid conduits due to their relative simplicity and low cost. Generally, heat trace cables are disposed along the length of the conduits or wrapped around the conduits and are fastened at regular intervals with bands, retaining straps or any other suitable fasteners, as shown in U.S. Pat. No. 5,294,780 to Montierth et al., U.S. Pat. No. 5,086,836 to Barth et al., U.S. Pat. No. 4,791,277 to Montierth et al., U.S. Pat. No. 4,152,577 to Leavines, U.S. Pat. No. 4,123,837 to Horner, U.S. Pat. No. 3,971,416 to Johnson, and U.S. Pat. Reissue No. 29,332 to Bilbro. Fastening heat trace cables to the pipe or conduit has proven to be time consuming and burdensome, particularly for replacement of utility lines and continuous manufacturing processes, among others, where time is of the essence.

To expedite the replacement of utility lines, U.S. Pat. No. 6,792,200 proposes a pre-fabricated heat-traced pipe, wherein a pipe to be heated, a heat trace, and a connector for electrically connecting the heat trace to a power source are cured and integrally formed beforehand and inventoried before a need for replacing an old pipe arises. While this prefabricated pipe saves some time with respect to replacement of utility lines, it requires a custom-made heat-traced pipe, thereby increasing undesirable inventory space and manufacturing and maintenance costs.

SUMMARY

In one form, a module heater system includes a plurality of modular units aligned along a longitudinal direction of a fluid conduit for heating a fluid contained in the fluid conduit. The modular units each include a carrier member, a heating element mounted on the carrier member and a thermal insulation jacket surrounding the carrier member and the heating element. The carrier member defines a receiving space for receiving the fluid conduit therein and includes side slots recessed from outer surfaces of the carrier member. The thermal insulation jacket includes an upper half portion and a lower half portion. The upper half portion and the lower half portion are self-locked in the side slots of the carrier member.

In another form, a modular unit is provided that include a carrier member defining a receiving space for receiving a fluid conduit, a heating element disposed on a surface of the carrier member, and a thermal insulation jacket surrounding the carrier member. The thermal insulation jacket includes an upper portion and a lower portion. The upper and lower portions have mating features for securing the upper and lower portions together.

In still another form, a modular heater system includes a modular unit and an end cap. The modular unit includes a carrier member defining a receiving space for receiving a fluid conduit, a heating element disposed on a surface of the carrier member, and a thermal insulation jacket surrounding the carrier member. The end cap is attached to a longitudinal end of the modular unit. The end cap includes a tubular flange for fitting into an opening of an adjacent modular unit or an adjacent mounting structure for securing the modular unit to the adjacent modular unit or the adjacent mounting structure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIGS. 10A to 10F are side views of the various modular units of FIG. 8;

FIGS. 13A to 13F are side views of the various modular units of FIG. 9;

Corresponding reference numerals indicate corresponding parts throughout the several views of the drawings.

DETAILED DESCRIPTION

The following description is merely exemplary in nature and is not intended to limit the present disclosure, application, or uses.

The structure of a heater in accordance with the present disclosure is now described in greater detail. At the outset, it should be understood that the word "conduit" as used throughout this specification includes, without limitation, tubes, pipes, and other enclosed or partially enclosed members for the transfer of fluids or other materials such as powders or slurries. The materials carried by the conduits described herein includes solids, liquids, and gases and may include, by way of example, fluids that are transferred within a semiconductor processing apparatus. The following description of the various forms with reference to such a semiconductor processing apparatus is merely exemplary in nature and is in no way intended to limit the disclosure, its application, or uses. Accordingly, the teachings of the present disclosure are not limited to a semiconductor processing apparatus and can be applied to any system of conduits while remaining within the scope of the present disclosure.

First Embodiment

Figure 1:
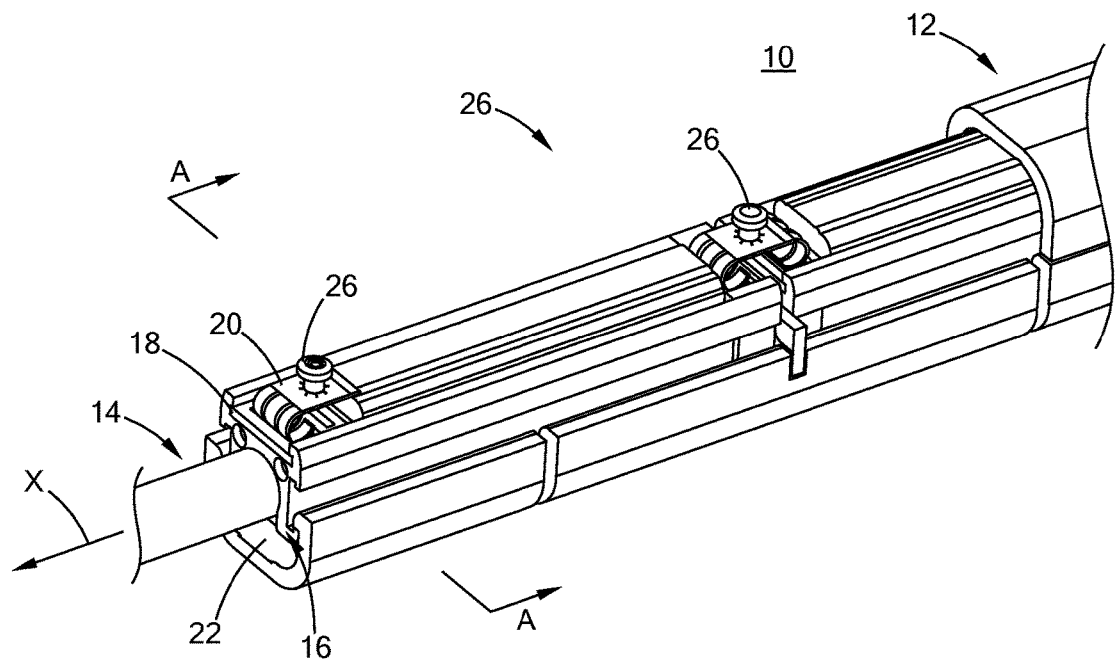
FIG. 1 is a perspective view of a modular heater system constructed in accordance with a first embodiment of the present disclosure, wherein a portion of the interior of the modular heater system is shown.
Figure 2:
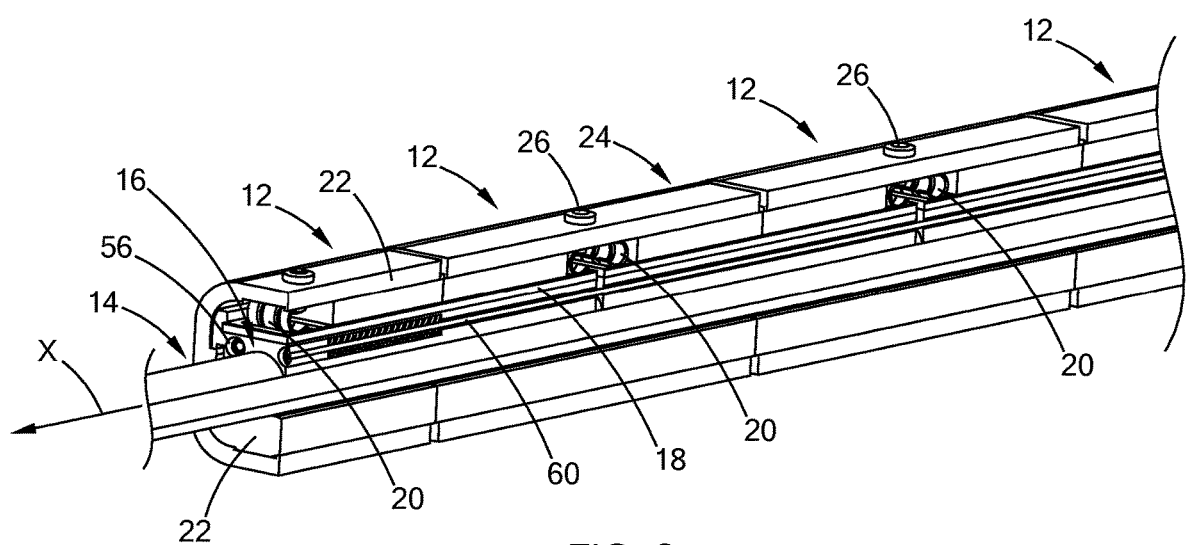
FIG. 2 is a perspective, cross-sectional view of a modular heater system constructed in accordance with the first embodiment of the present disclosure.

Referring to FIGS. 1 and 2, a modular heater system 10 includes a plurality of modular units 12 aligned along a longitudinal direction X of a fluid conduit 14 for heating a fluid contained therein. Three modular units 12 are shown in FIG. 1, whereas four modular units 12 are shown in FIG. 2. The number of the modular units 12 depends on the length of the fluid conduit 14 to be heated.

The modular units 12 each include a carrier member 16 surrounding the fluid conduit 14, a heating element 18 disposed on the carrier member 16, a conductor 20 disposed on and contacting the heating element 18, an inner insulating material 22, and a thermal insulation jacket 24 enclosing the fluid conduit 14, the carrier member 16, the heating element 18, the conductor 20, and the inner insulating material 22 therein. The thermal insulation jacket 24 define through holes corresponding to locations of the conductors 20 such that a plurality of conducting pins 26 can be inserted into the through holes of the thermal insulation jacket 24 to connect the heating element 18, the conductors 20 to an external power source (not shown).

Figure 3:
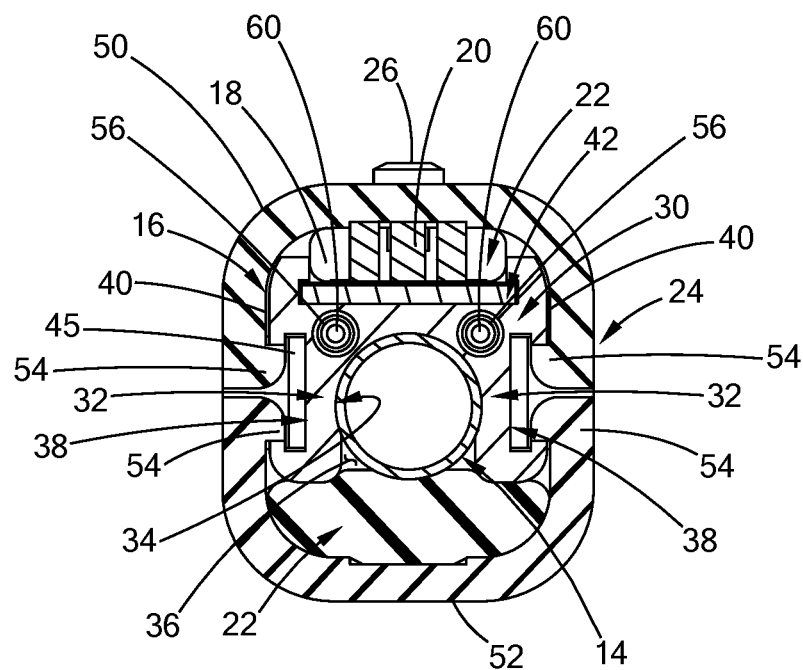
FIG. 3 is a cross-sectional view of a modular heater system taken along line A-A of FIG. 1.

Referring to FIG. 3, the carrier member 16 has a substantially inverted U shape and includes an upper wall 30, and a pair of side walls 32 extending vertically and downwardly from the upper wall 30. The upper wall 30 and the pair of side walls 32 jointly form a circular inner surface 34 defining a receiving space 36 for receiving the fluid conduit 14 therein. The circular inner surface 30 substantially conforms to the shape of the fluid conduit 14 so that when the fluid conduit 14 is disposed in the receiving space 32, the fluid conduit 14 contacts the circular inner surface 34 of the carrier member 16. The side walls 32 of the carrier member 16 each define a side slot 38 recessed from an outer surface 40 of the side walls 32. The upper wall 30 of the carrier member 16 may define a guided slot 42 for receiving the heating element 18 therein.

The carrier member 16 is made of a thermally conducting material to conduct heat transfer from the heating element 18 to the fluid conduit 14. Preferably, the carrier member 16 is made of a metal having good thermal conductivity. In the present embodiment, the carrier member 16 may have an elongated shape and formed as a single piece component. The carrier member 16 is provided around the fluid conduit 14 to help mounting of the heating element 18 on the carrier member 16 and mounting of the thermal insulation jacket 24 around the carrier member 16. The carrier member 16 has the function of supporting the heating element 18 thereon, diffusing heat from the heating element 18 to the fluid conduit 14, and securing the thermal insulation jacket 24 around the carrier member 16.

Figure 4:
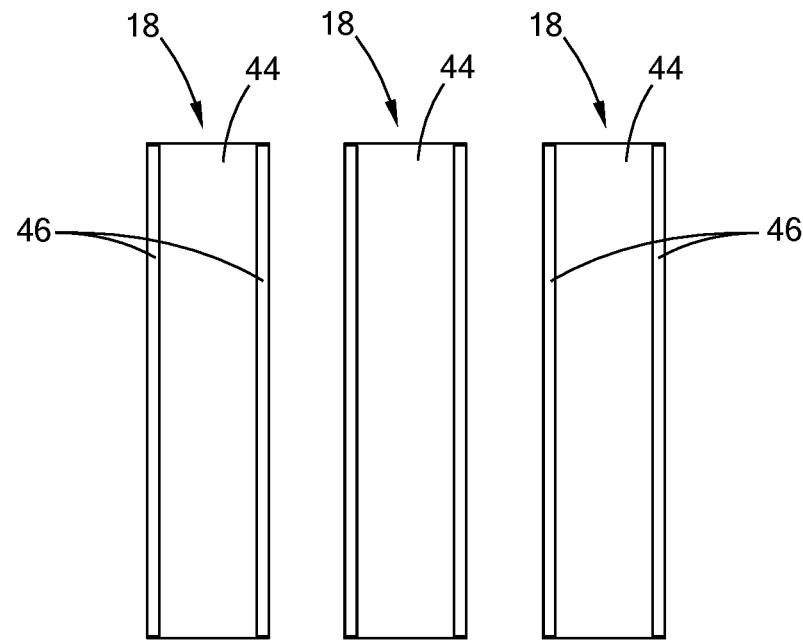
FIG. 4 is a plan view of a plurality of heating elements used in a modular heater system constructed in accordance with the teachings of the present disclosure.

Referring to FIG. 4, the heating elements 18 may include an elongated plate body 44 on which resistive heating circuits are formed, which in this exemplary form are a thick film resistive heaters, and a pair of power busses 46 disposed along the longitudinal sides of the elongated plate body 44. The heating elements 18 may take any form as long as it can be disposed in the guided slot 42 of the carrier member 16.

Referring back to FIG. 3, the thermal insulation jacket 24 includes an upper half portion 50 and a lower half portion 52, each defining a pair of locking flanges 54 at opposing longitudinal sides to allow for self-locking around the carrier member 16 by inserting the locking flanges 54 into the side slots 38 of the carrier member 16.

Optionally, another heating element may be disposed in each of the side slots 38 of the carrier member 16 as indicated by reference number 45, if necessary and if the side slots 38 are formed to have sufficient depth to accommodate both the optional heating element 45 and the locking flanges 54 of the thermal insulation jacket 24.

The insulating material 22 is disposed between the heating element 18 and the upper half portion 50 and between a lower end of the carrier member 16 and the lower half portion 52 of the thermal insulation jacket 24 to further thermally insulate the fluid conduit 14 and heating element 18 against heat transfer to the thermal insulation jacket 24.

As clearly shown in FIG. 2, the carrier members 16 may each define at least one alignment hole 56 extending along the longitudinal direction X of the carrier member 16. When a plurality of modular units 12 are disposed, the alignment holes 56 of different carrier members 16 are aligned. An alignment rod 60 may be inserted through the alignment holes 56 of the modular units 12 to connect the modular units 12 together and maintain alignment of the plurality of modular units 12.

Second Embodiment

Figure 5:
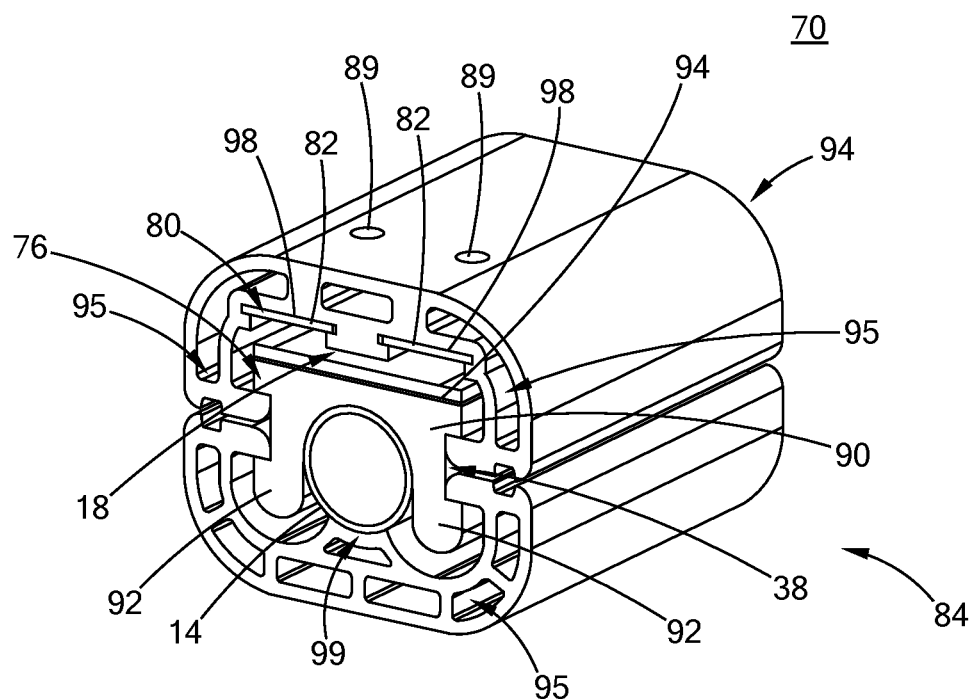
FIG. 5 is a perspective, cross-sectional view of a modular heater system constructed in accordance with a second embodiment of the present disclosure.

Referring to FIG. 5, a modular unit 70 according to a second embodiment of the present disclosure is shown to be structurally similar to the modular unit 12 of FIGS. 1 to 3 with modifications. In the present embodiment, like components are indicated by like reference numerals and the description thereof is omitted herein for clarity.

The modular unit 70 includes a carrier member 76 surrounding the fluid conduit 14, a heating element 18 disposed on the carrier member 76, at least one conducting member 80 disposed on the heating element 18, and a thermal insulation jacket 84 enclosing the fluid conduit 14, the carrier member 76, the heating element 18, the conducting member 80 therein. The heating element 18 has the similar structure of that of FIGS. 1 to 3.

Similar to the carrier member 16 of the FIGS. 1 to 3, the carrier member 76 includes an upper wall 90, and a pair of side walls 92 extending vertically and downwardly from the upper wall 90. The upper wall 90 and the side walls 92 jointly define a receiving space for receiving the fluid conduit 14. The upper wall 90 of the carrier member 76 has an upper flat surface 94 on which the heating element 18 is disposed. As in the carrier member 16 of FIGS. 1 to 3, the side walls 92 of the carrier member 94 each define a side slot 38.

The thermal insulation jacket 84 includes an upper half portion 94 and a lower half portion 96. The upper half portion 94 includes a pair of grooves 98 recessed from an inner surface of the upper half portion 94. The lower half portion 94 includes a protruding portion 99 extending from an inner surface of the lower half portion 94 toward the fluid conduit 14. The protruding portion 99 may also contact the fluid conduit 14 to help support the fluid conduit 14 in the receiving space of the carrier member 76. The upper half portion 94 and the lower half portion 96 each include air pockets 95, which reduce heat losses through the thermal insulation jacket 84.

Figure 6:
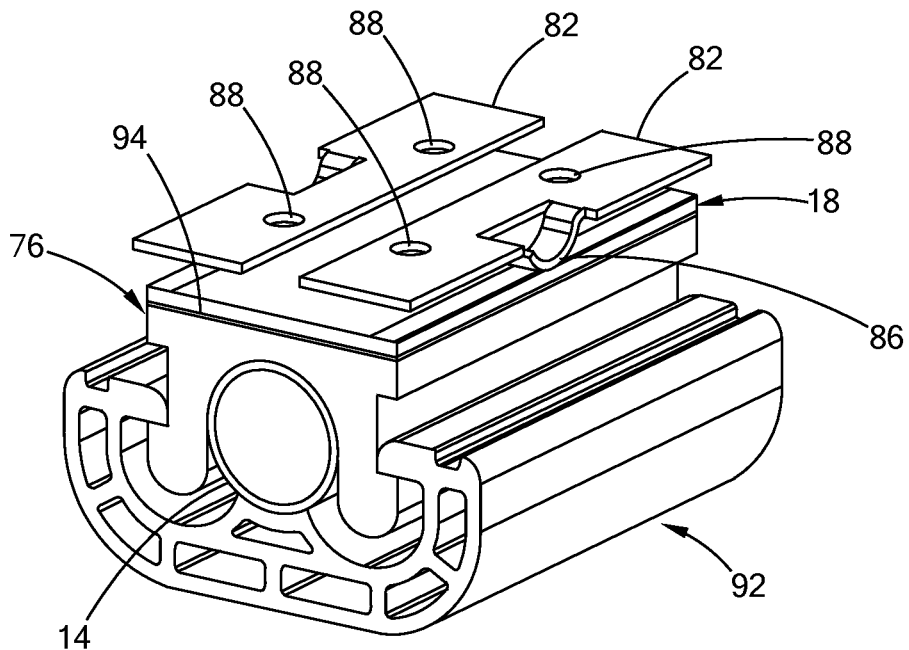
FIG. 6 is another perspective, cross-sectional view of a modular heater system according to the second embodiment of the present disclosure, wherein an upper half body of a thermal insulation jacket is removed to expose the interior of the modular heater system.

Referring to FIG. 6, the conducting member 80 (or internal bussing) includes a pair of conducting plates 82 oppose the longitudinal sides of the heating element 18. The conducting plates 82 are received in the grooves 98 of the upper half portion 94 of the thermal insulation jacket 84. The conducting plates 82 each define a plurality of flexible arms 86 extending downwardly to contact the conductor busses 46 of the heating element 18. The conducting plates 82 define a plurality of holes 88 aligned with the holes 89 in the upper half portion 94 of the thermal insulation jacket 84. Conducting pins (not shown) may be inserted through the holes 88 of the conducting plates 82 and the holes 89 of thermal insulation jacket 84 to engage the conducting plates 82 such that power can be supplied from an external power source, through the conducting pin (not shown), the conducting plates 82, the flexible arms 86, the power busses 46, to the resistive heating circuits on the heating element 18.

While not shown in FIGS. 5 and 6, an insulating material may be provided between the heating element 18 and the conducting member 80 to electrically insulate the heating element 18 from the conducting member 80.

Third Embodiment

Figure 7:
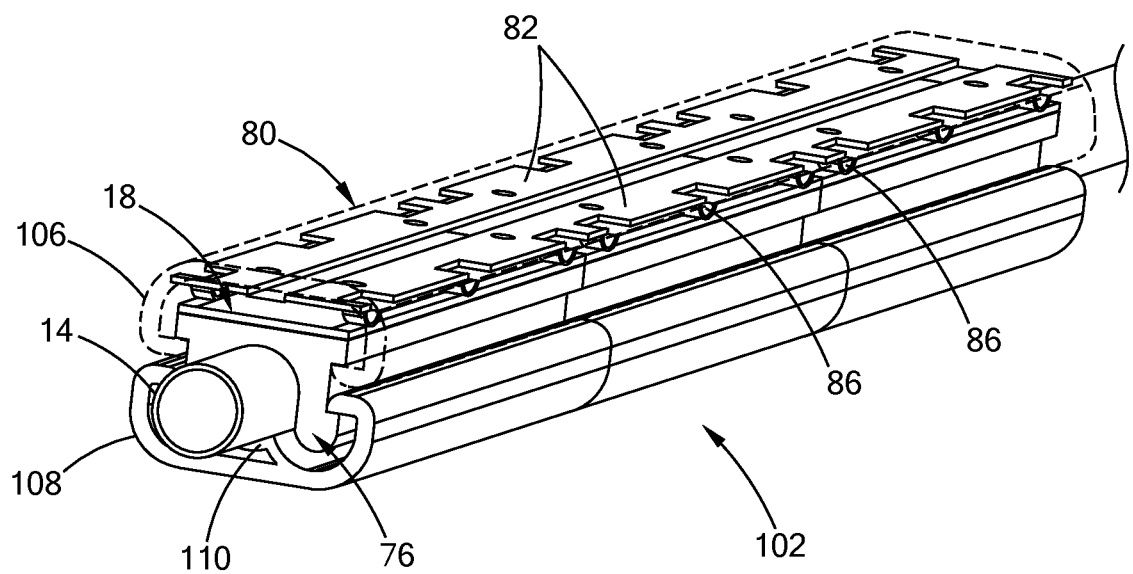
FIG. 7 is a perspective view of a modular heater system constructed in accordance with a third embodiment of the present disclosure.

Referring to FIG. 7, a modular unit 100 according to a third embodiment of the present disclosure is structurally similar to the modular unit of FIGS. 5 and 6 differing in that the modular unit 100 is longer and the thermal insulation jacket 102 has a relatively lower profile.

More specifically, the modular unit 100 includes a carrier member 76 surrounding the fluid conduit 14, a heating element 18 disposed on the carrier member 76, a conducting member 80 disposed above the heating element 18, and a thermal insulation jacket 102 enclosing the fluid conduit 14, the carrier member 76, the heating element 18, the conducting member 80 therein. The conducting member 80 includes a pair of conducting plates 82 and a plurality of engaging arms 86 engaging the power busses 46 of the heating element 18.

The thermal insulation jacket 102 includes an upper half part 106 and a lower half part 108. The lower half part 108 includes a protruding portion 110 protruding toward the fluid conduit 14 to help support the fluid conduit 14 in the receiving space of the carrier member 76. Unlike the lower half part of the thermal insulation jacket 24 of FIGS. 1 to 3, the lower half part of the thermal insulation jacket 102 of the present embodiment does not have any space for receiving an inner insulating material 22 and has a smaller thickness than that of the first and second embodiments. Therefore, the outer profile of the thermal insulation jacket 102 can be made smaller.

The modular construction of the heater system according to the teachings of the present disclosure provides a relatively low cost heater system that can be easily adapted to a conduit system. The modular units 12, 70 and 100 provide the basic building blocks, which can be relatively easily mounted around the fluid conduit 14 and are scalable. No wiring is provided inside the modular units 12, 70 and 100. Wiring is provided only outside the modular heater system for connecting the conducting pins disposed on the thermal insulation jacket to the external power supply, thereby reducing wiring complexity. The modular units 12, 70 and 100 can be easily aligned and provided to abut against each other along the longitudinal direction X of the fluid conduit 14 to improve aesthetics. An alignment rod 60 can be inserted into the alignment holes of the carrier members to integrate the plurality of modular units 12, 70 and 100 into one integrated unit.

Fourth Embodiment

Figure 8:
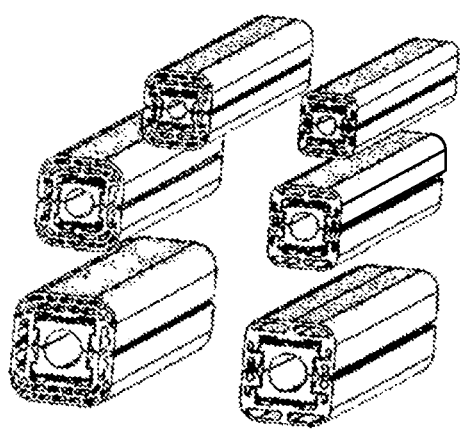
FIG. 8 is a perspective view of modular units of various forms, wherein the carrier members have a two-piece structure and the thermal insulation jackets have smooth surfaces, according to a fourth embodiment of the present disclosure.
Figure 9:
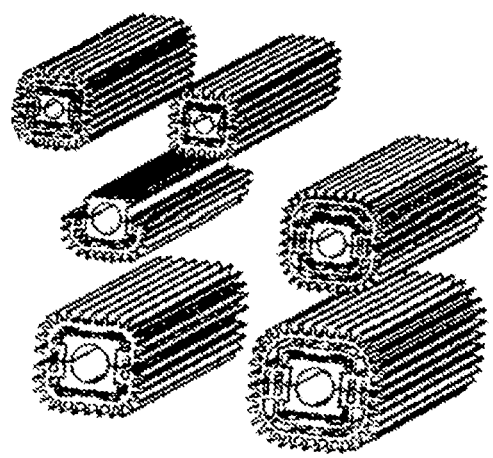
FIG. 9 is a perspective view of modular units of various forms, wherein the carrier members have a two-piece structure and the thermal insulation jackets having finned surfaces.

Referring to 8 and 9, the modular units according to a fourth embodiment may have a variety of forms according to the teachings of the present disclosure. FIG. 8 shows various forms of modular units including thermal insulation jackets having smooth outer surfaces. FIG. 9 shows various forms of modular units including thermal insulation jackets having finned surfaces for a more touch safe operation.

In FIGS. 8 and 9, the carrier members each have two identical pieces, rather than a one-piece component as shown in the first, second and third embodiments. Each piece can have an upper wall for supporting a heating element similar to that shown in any of the first to third embodiments, whether it is a guided slot as shown in the first embodiment or an upper flat surface as shown in the second and third embodiments. Therefore, the carrier member, having two identical pieces, can be configured to carry two heating elements 18 for higher performance applications.

Referring to FIGS. 10A to 10F, the modular units 120a, 120b, 120c, 120d, 120d, 120e, 120f each include a carrier member and a thermal insulation jacket surrounding the carrier member. The carrier members each include an upper piece 122a, 122b, 122c, 122d, 122e, 122f and a lower piece 124a, 124b, 124c, 124d, 124e, and 124f. The upper piece 122a, 122b, 122c, 122d, 122e, 122f and the lower piece 124a, 124b, 124c, 124d, 124e, and 124f in one carrier member are identical. Therefore, the carrier members can carry two heating elements 18. The upper piece and the lower piece of each carrier member jointly define the side slots on the side walls for receiving locking flanges of the thermal insulation jacket 128a, 128b, 128c, 128d, 128e, 128f therein. The thermal insulation jackets 128a, 128b, 128c, 128d, 128e, 128f may further define receiving spaces for receiving latching elements 130a, 130b, 130c, 130d, 130e, 130f therein, which secure the upper assembly to the lower assembly.

Figure 11:
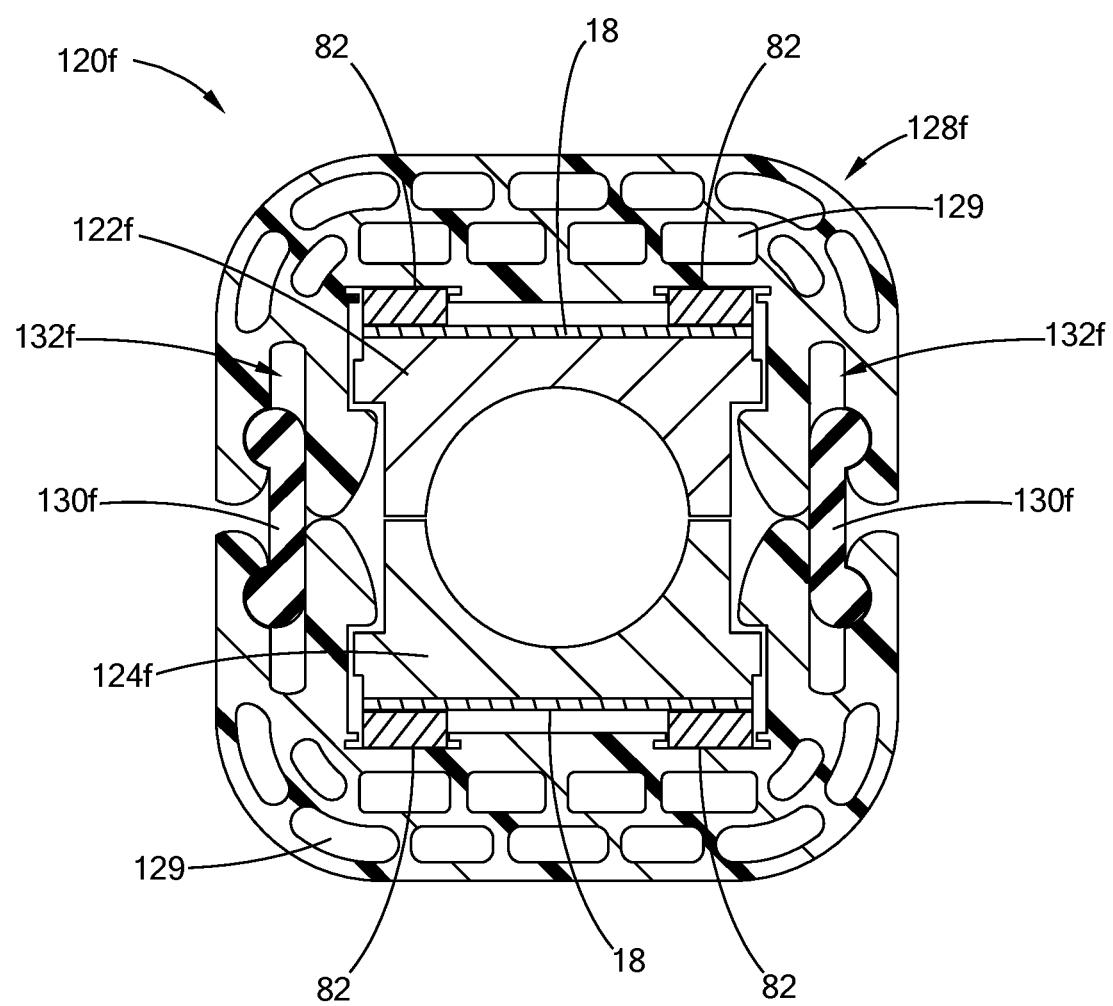
FIG. 11 is an enlarged view of the modular unit of FIG. 10F.

FIG. 11 is an enlarged view of the modular unit 120f of FIG. 10F, wherein the modular unit 120f includes a carrier member including an upper piece 122f and a lower piece 124f, heating elements 18 disposed on the upper and lower sides of carrier member, particularly the upper side of the upper piece 122f and the lower side of the lower piece 124f, and latching elements 130f on the right and left sides of the carrier member within the receiving spaces 132f defined by the thermal insulation jacket 128f. The thermal insulation jacket 128f defines a plurality of air pockets 129, which act as good thermal insulator to further reduce heat loss from the carrier member to the thermal insulation jacket 128f.

Figure 12A:
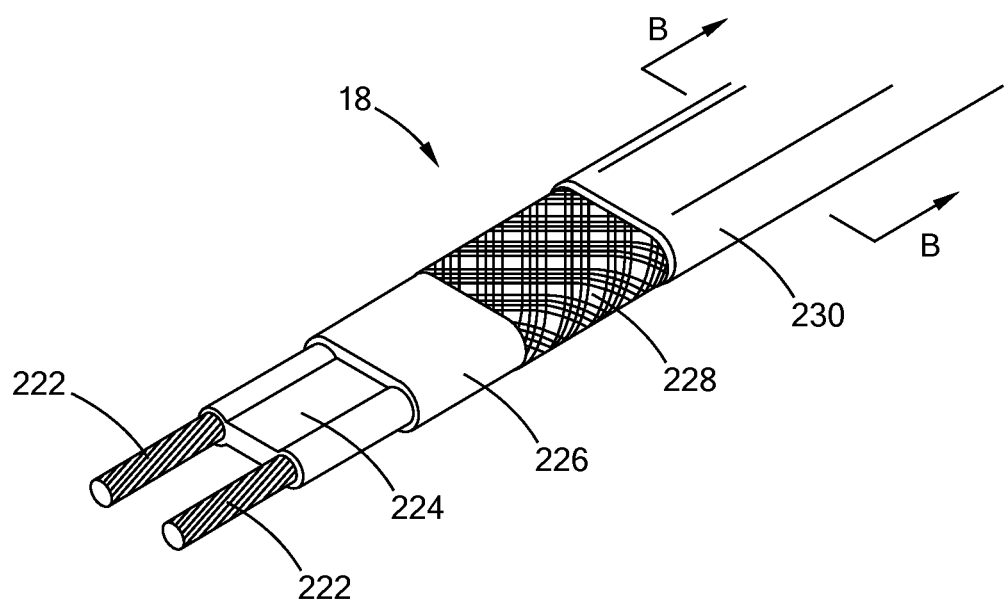
FIG. 12A is a perspective view of an additional heating element disposed in a receiving space of the thermal insulation jacket of a modular unit.
Figure 12B:
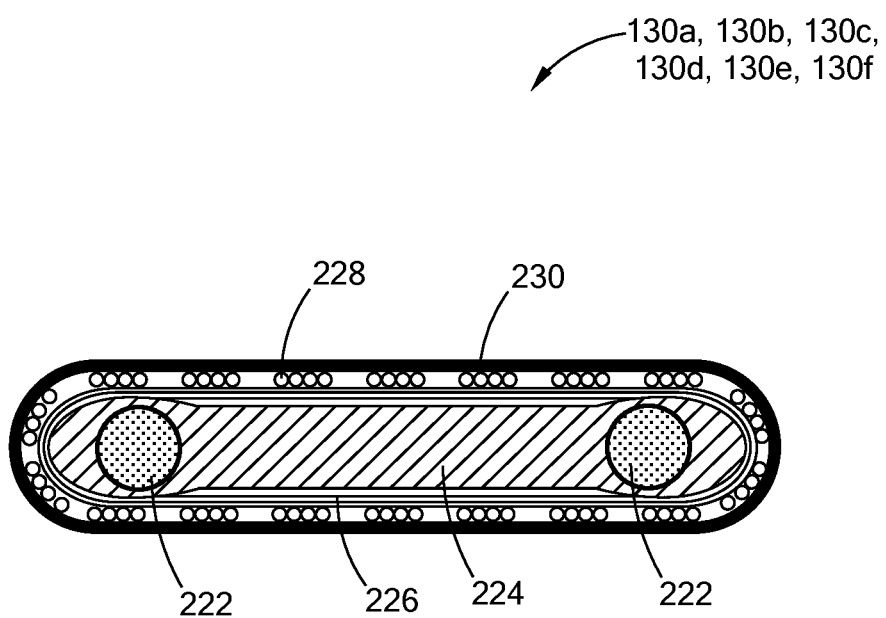
FIG. 12B is a cross-sectional view of the additional heating element taken along line B-B of FIG. 12A.

Referring to FIGS. 12A and 12B, the heating elements 18 may be in the form of a heat trace cable. The heat trace cable typically includes a pair of bus-conductors 222, which are surrounded by a semiconductive polymer material 224 that functions as a heating element. A dielectric or insulator material 226 surrounds the semiconductive polymer material 224, which may optionally be surrounded by a metal braid material 228 as shown for additional functionality such as a ground plane. Further, an outer jacket 230 surrounds the metal braid material 228 to protect the overall assembly, and the outer jacket 230 is typically an insulating material such as a thermoplastic.

The heating elements 18 may be any form of heater, including but not limited to a layered heater such as those disclosed in U.S. Pat. No. 8,680,443, which is commonly assigned with the present application and the contents of which are incorporated herein by reference in their entirety. The heating elements 18 may also be resistive elements embedded in any substrate/insulation such as by way of example flexible insulated heaters as disclosed in U.S. Pat. No. 5,714,738, which is also commonly assigned with the present application and the contents of which are incorporated herein by reference in their entirety.

Figure 14:
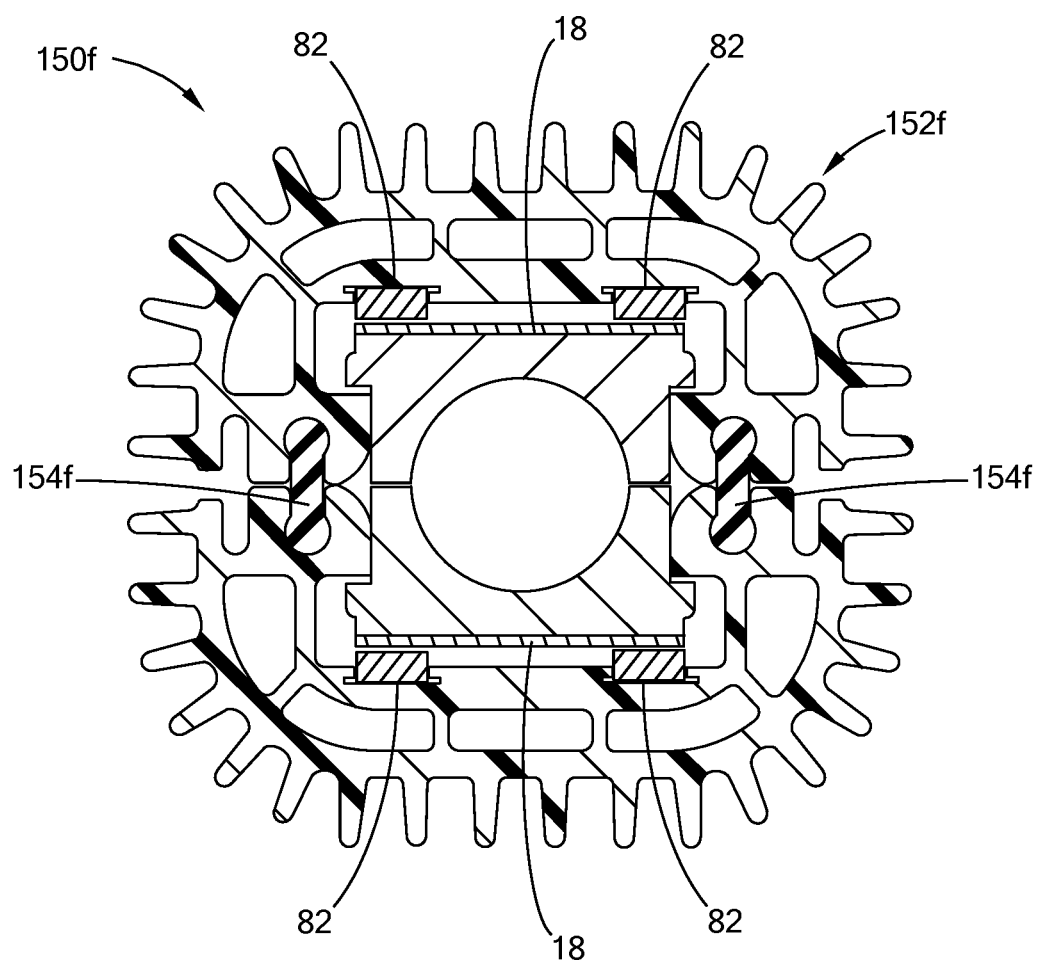
FIG. 14 is an enlarged view of the modular unit of FIG. 13F.

Referring to FIGS. 13A to 13F, the modular units 150a, 150b, 150c, 150d, 150f have structures similar to those shown in FIGS. 11A to 11F except that the modular units include thermal insulation jackets 152a, 152b, 152c, 152d, 152e, 152f having fins extending from outer surfaces. The thermal insulation jackets 150a, 150b, 150c, 150d, 150e, 150f define receiving spaces for receiving additional heating elements 154a, 154b, 154c, 154d, 154e, 154f therein. FIG. 14 is an enlarged view of the modular unit 150f of FIG. 13F.

Figure 15:
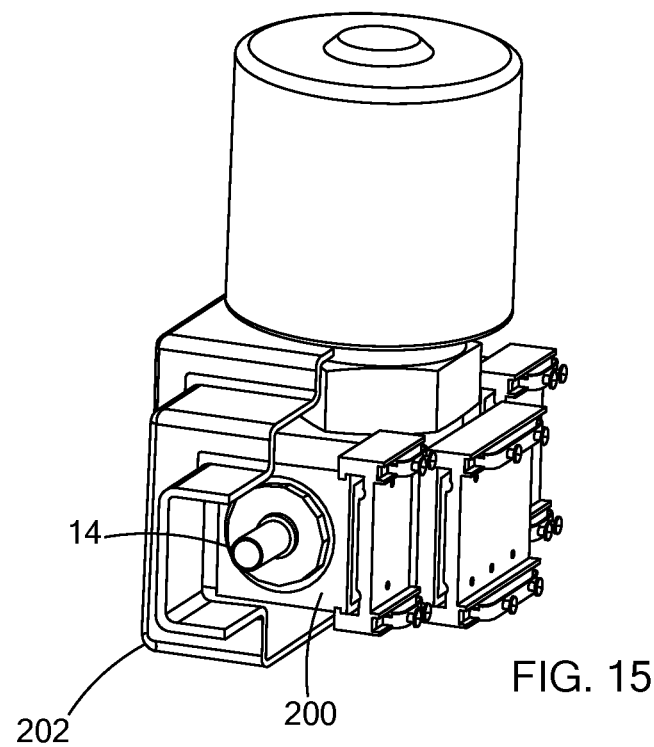
FIG. 15 is a view showing an application of the modular heater system in a valve system constructed in accordance with the teachings of the present disclosure.
Figure 16:
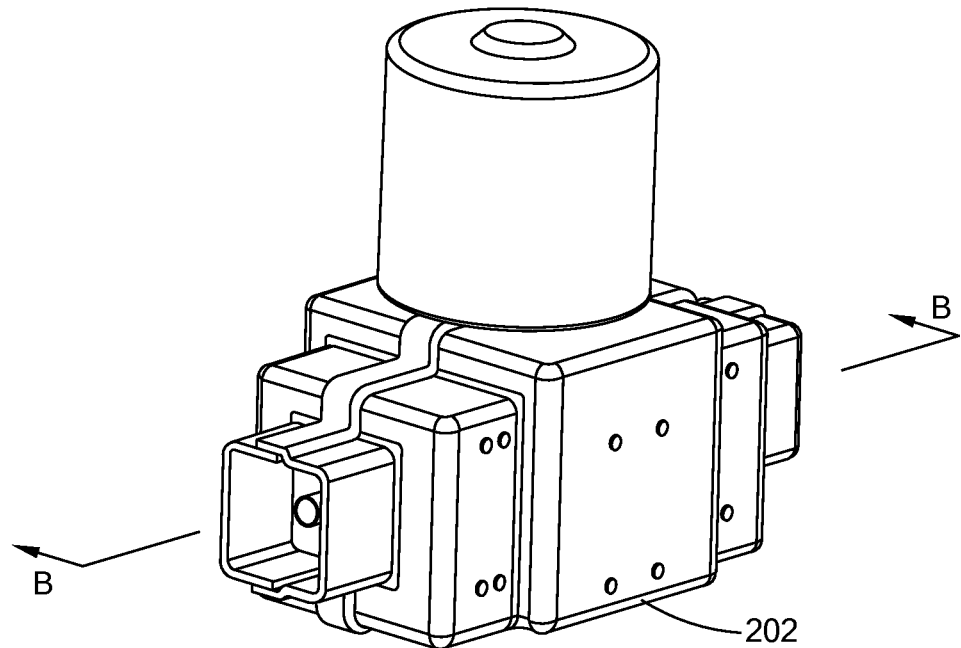
FIG. 16 is a perspective view of the valve system wherein a portion of shells of the valve system is removed to expose the modular heater system inside.
Figure 17:
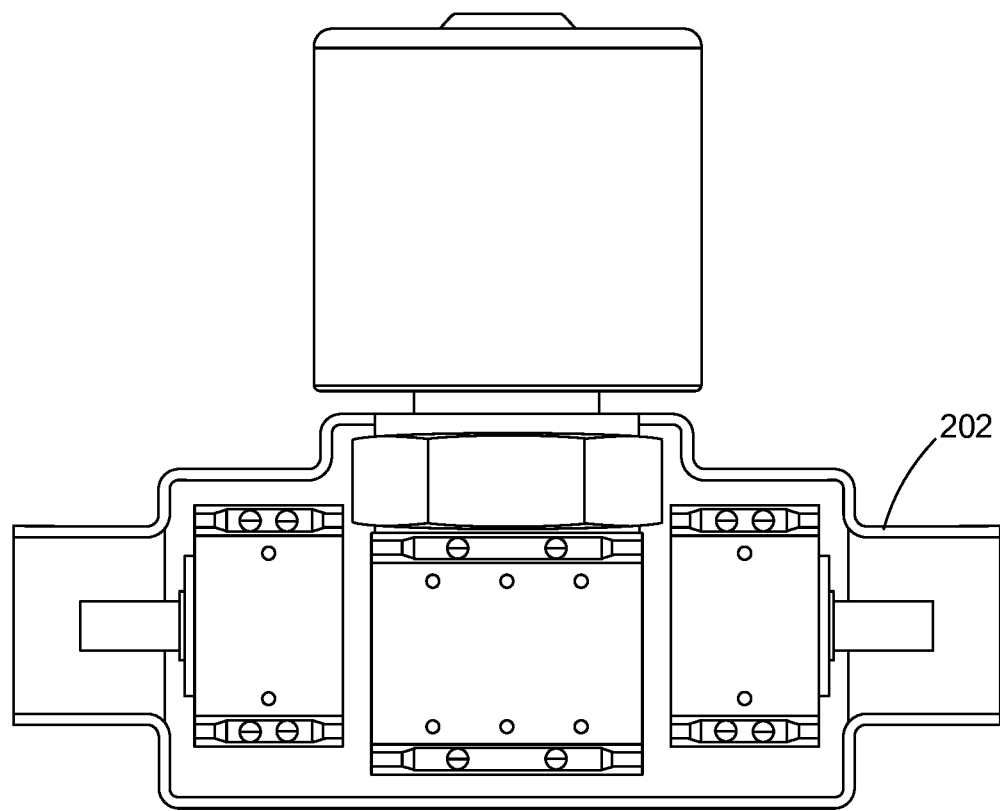
FIG. 17 is a cross-sectional view of the valve system wherein a modular heater system constructed in accordance with the teachings of the present disclosure is assembled, taken along line B-B of FIG. 16.

FIGS. 15 to 17 show an application of the modular heater system as a valve heater. FIG. 15 shows the modular heater system is provided around a valve 14. The modular heater system disclosed in any of the embodiments of the present disclosure is bonded to an aluminum thermal transfer interface 200. FIGS. 16 and 17 show outer shells 202 are molded or vacuum formed around the modular heater system to enclose the fluid conduit 14 and the modular heater system therein.

Fifth Embodiment

Figure 18:
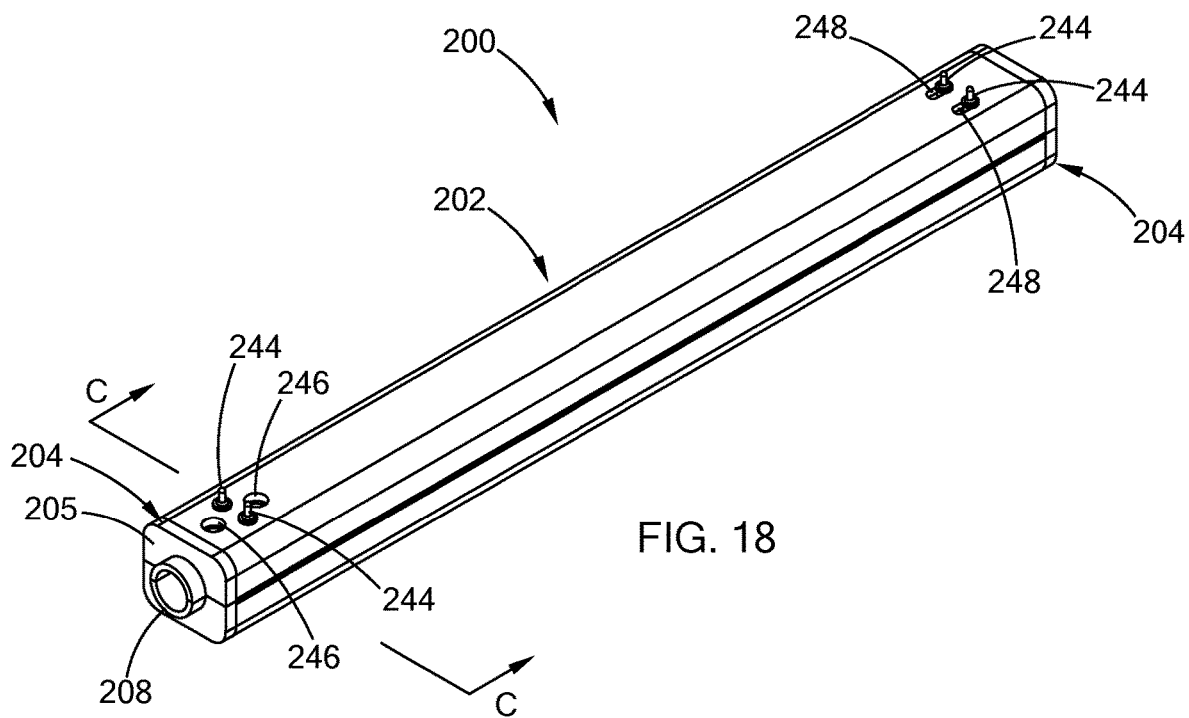
FIG. 18 is a perspective view of a modular heater system according to a fifth embodiment of the present disclosure.

Referring to FIG. 18, a modular heater system 200 according to a fifth embodiment of the present disclosure includes a modular unit 202 and a pair of end caps 204 disposed at longitudinal ends of the modular unit 202. The modular unit 202 and the end caps 204 surround a fluid conduit (not shown) to be heated. The end caps 204 each have a plate portion 205 attached to the modular unit 202 and a tubular flange 208 protruding from the plate portion 205. The tubular flange 208 of the end cap 204 can fit into a recess of an adjacent modular unit (not shown) or an adjacent mounting structure (not shown) so as to connect the modular unit 204 to an adjacent modular unit or to an adjacent mounting structure.

Figure 19:
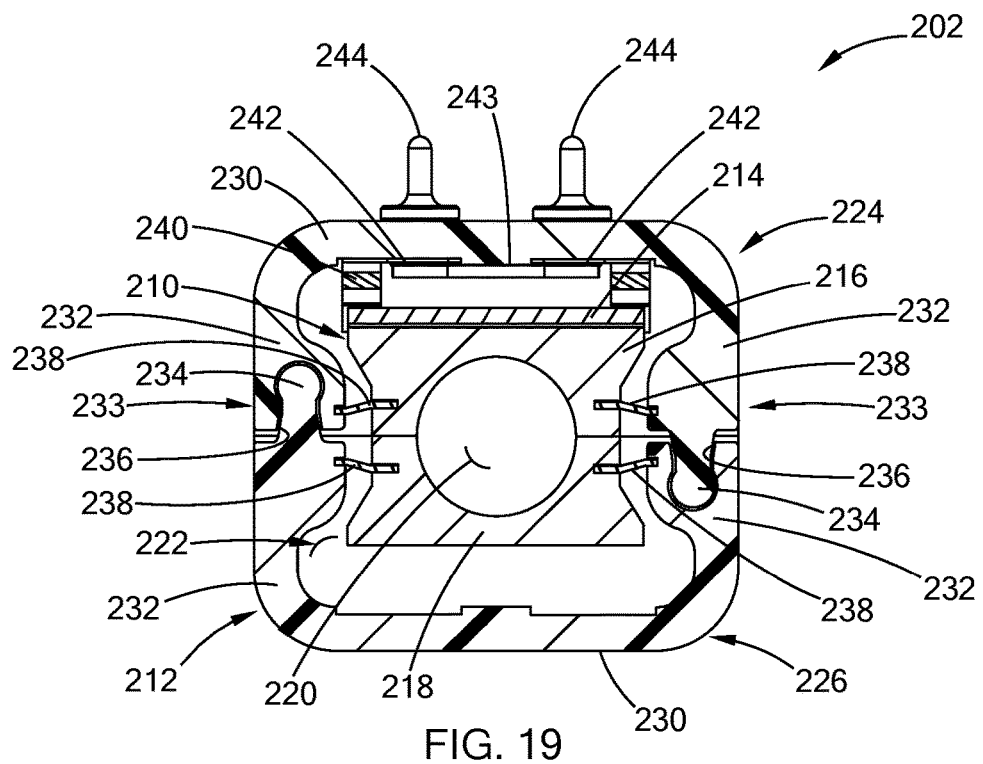
FIG. 19 is a cross-sectional view of the modular heater system of FIG. 18, taken along line C-C of FIG. 18.

Referring to FIG. 19, the modular unit 202 includes a carrier member 210, a thermal insulation jacket 212 surrounding the carrier member 210, and at least one heating element 214 disposed on at least one surface of the carrier member 210. The carrier member 210 includes an upper piece 216 and a lower piece 218 jointly defining a receiving space 220 for receiving a fluid conduit (not shown). The upper piece 216 and the lower piece 218 of the carrier member 210 are made of a metal, for example, aluminum, to diffuse heat from the heating element 214 to the fluid conduit received in the receiving space 220 to facilitate heat transfer from the heating element 214 to the fluid conduit. While only one heating element 214 is shown to be disposed on one surface of the carrier member 210, more than one heating element 214 may be disposed on more than one surface of the carrier member 210, for example, one heating element 214 on each of the upper piece 216 and the lower piece 218 of the carrier member 210. An air gap 222 is defined between the carrier member 210 and the thermal insulation jackets 212 and acts as a thermal break to keep the heat inside the thermal insulation jackets 212.

The thermal insulation jacket 212 includes an upper portion 224 and a lower portion 226. The upper portion 224 and the lower portion 226 each define a substantially U-shape cross section and includes an upper wall 230, a pair of side walls 232 extending from opposing ends of the upper wall 230. The upper and lower portion 224 and 226 each have a pair of free ends 233 at the side walls 232. The free ends 233 are enlarged inwardly toward the carrier member 210 while maintaining a flat outer surface of the thermal insulation jacket. The side surfaces of the carrier member 210 opposing the enlarged free ends 233 have a slightly concave outer surface to accommodate the enlarged free ends 233.

The free ends 233 may define either a protrusion 234 or a recess 236. As an example, the upper and lower portions 224, 226 of the thermal insulation jacket 212 each include a protrusion 234 at one side wall 232 and a recess 236 at the other side wall 232. The protrusions 234 and the recesses 236 of the upper and lower portions 224, 226 have complementary shapes such that the protrusion 234 at the upper half portion 224 can fit into an opposing recess 236 at the lower portion 226 and that the protrusion 234 at the lower portion 226 can fit into the opposing recess 236 at the upper portion 224. Therefore, the upper portion 224 and the lower portion 226 can be self-locked. Alternatively, the upper portion 224 may include a pair of protrusions 234 and the lower portion 226 may include a pair of recesses 236 or vice versa as long as the protrusions 234 can fit into corresponding recesses 236 to lock the upper and lower portions 224 and 226 of the thermal insulation jacket 212 together.

The modular unit 202 further includes a plurality of shims 238 disposed across the air gap 222 to connect the carrier member 210 to the thermal insulation jackets 212 to maintain the air gap 220 between the carrier member 210 and the thermal insulation jackets 212. Before the upper portion 224 of the thermal insulation jacket 212 is secured to the lower portion 226 of the thermal insulation jacket 212 by fitting the the protrusions 234 into the recesses 236, a fixed air gap may not be maintained between the upper portion 224 of the thermal insulation jacket 212 and the upper piece 216 of the carrier member 210 if no connecting component is used. Similarly, a fixed air gap may not be maintained between the lower half portion 226 of the thermal insulation jacket 212 and the lower piece 218 of the carrier member 210 if no connecting component is used. Therefore, the shims 222 can maintain a fixed air gap 222 between the upper piece 216 and the upper half portion 224 and between the lower piece 218 and the lower half portion 226 before the upper and lower portions 224 and 226 of the thermal insulation jacket 212 are locked together. The shims 222 may have a spring force and are elastic to facilitate mounting of the modular unit 202 around around the fluid conduit.

The modular unit 202 may further include a conductor 240 and a bus bar 242 for connecting the heating element 214 to an external power terminal 244. The power terminals 244 extends through openings 246 (shown in FIG. 18) of the thermal insulation jacket 212, particularly the upper portion 232, to engage the bus bar 242. The power terminals 244 are connected to an external power supply via wires. Therefore, the wires are provided outside the modular unit 202, rather than inside the modular unit 202 to simplify the structure of the modular unit 202 and mounting of the modular unit 202 around the fluid conduit. A dielectric material 243 may be provided on a surface of the bus bar 242 facing the heater element 214 to keep the bus bar 242 in place and to electrically insulate the heating element 214 from the bus bar 242.

Some of the openings through the thermal insulation jacket 212 may be in the form of elongated slots 248 to provide room for thermal expansion/contraction of the power terminals 244. Some of the openings 246 may be used for insertion of sensors (not shown). The openings for sensors do not need to be at the longitudinal ends of the modular unit 202, and may be located anywhere at the modular unit 202.

Sixth Embodiment

Figure 20:
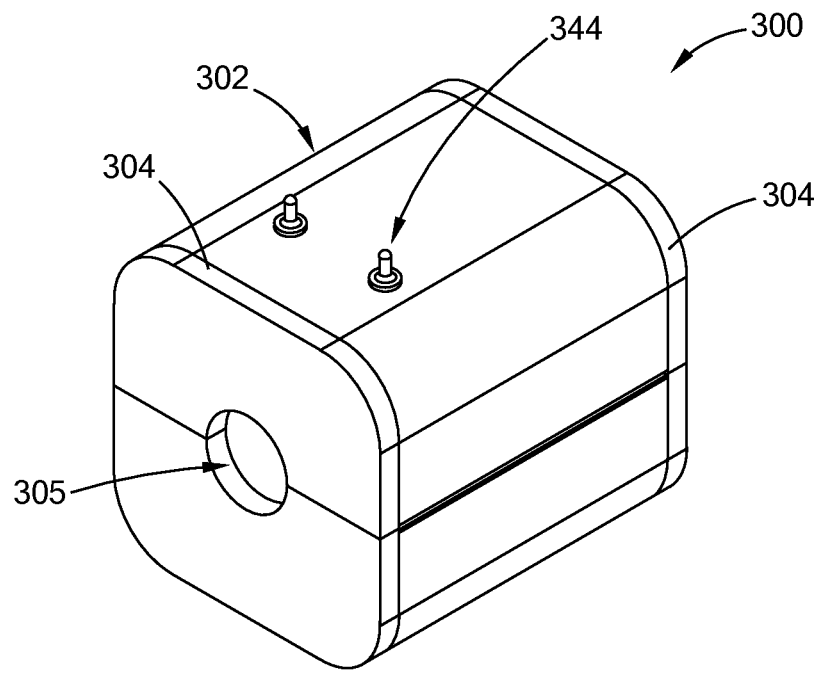
FIG. 20 is a perspective view of a modular heater system according to a sixth embodiment of the present disclosure.
Figure 21:
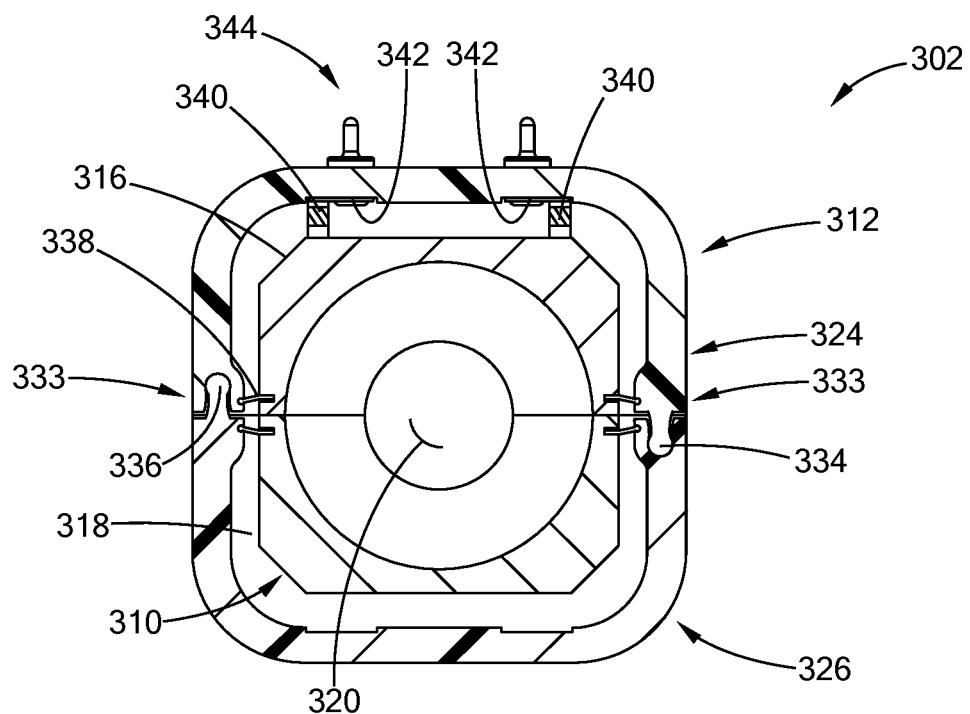
FIG. 21 is a cross-sectional view of a modular heater system of FIG. 20.

Referring to FIGS. 20 and 21, a modular heater system 300 according to a sixth embodiment has a structure similar to that the modular heater system 200 of FIGS. 18 and 19 except for the shapes of the carrier member and the thermal insulation jacket and the structure of the end caps. More specifically, the modular heater system 300 includes a modular unit 302 and a pair of end caps 304 at longitudinal ends of the modular unit 302. The end caps 304 each have a plate configuration defining a central opening 305 for receiving a corresponding tubular flange 208 of the end cap 204 of an adjacent modular heater system 200. Therefore, the modular heater system 200 of FIG. 18 can be secured to the modular heater system 300 of FIG. 20 by inserting the tubular flange 208 into the opening 305. The modular heater system 300 may have a first end cap 304 defining an opening 305 and a second end cap 204 defining a tubular flange 208 depending on applications. The modular unit 302 has a substantially rectangular cross section.

More specifically, the modular unit 302 includes a carrier member 310 defining a receiving space 320 for receiving a fluid conduit, a thermal insulation jacket 312 surrounding the carrier member 310, a heating element (not shown) disposed on a surface of the carrier member 310, a conducting member 340, bus bars 342, power terminals 344, and a plurality of shims 338. The heating element is in contact with the conducting member 340 and is connected to an external power source (not shown) through the conducting member 340, the bus bars 342, and the power terminals 344.

As in the fifth embodiment, the thermal insulation jacket 312 includes an upper portion 324 and a lower portion 326 each defining a protrusion 334 and a recess 336. Therefore, the upper and lower half portions 324 and 326 of the thermal insulation jacket 312 can be locked together by fitting the protrusions 334 into the recesses 336.

Unlike the thermal insulation jacket 212 in the fifth embodiment, the free ends 333 of the upper and lower portions 324 and 326 of the thermal insulation jacket 312 are only slightly enlarged. Therefore, the carrier member 310 can have flat side outer surfaces without being recessed to accommodate the enlarged free ends 333.

Seventh Embodiment

Figure 22:
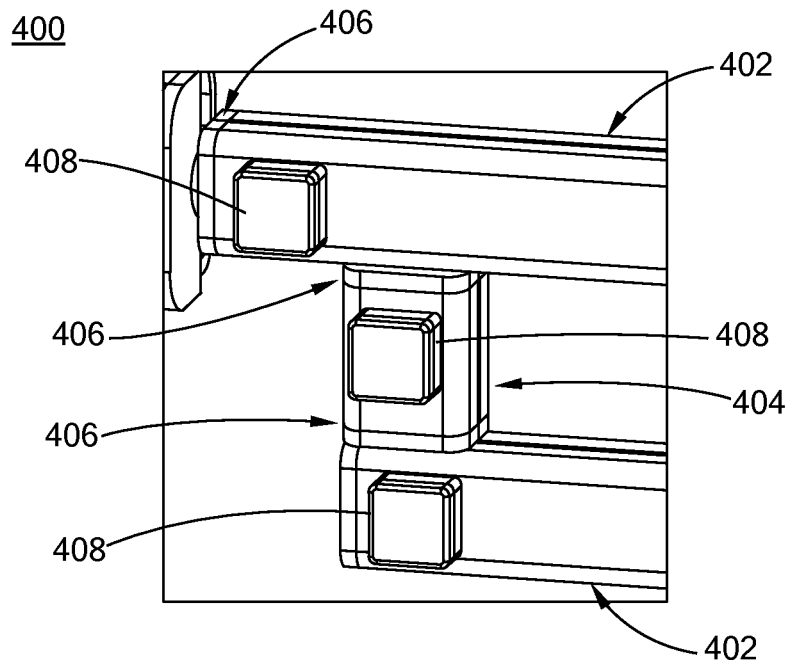
FIG. 22 is a perspective view of a modular heater system including a plurality of modular units that can be assembled to a piping system having a complex geometry according to a seventh embodiment of the present disclosure.

Referring to FIG. 22, a modular heater system 400 according to a seventh embodiment may be used to heat a piping system having multiple fluid conduits 401 and having a complex configuration. The modular heater system 400 may include first modular units 402, a second modular unit 404 connecting between the first modular units 402, and a plurality of end caps 406 at opposing ends of the first and second modular units 402, 404. The first modular unit 402 and the second modular units 404 may have a structure similar to the modular unit 202 of FIG. 18, or the modular unit 302 of FIG. 20. The end caps 406 are configured to engage an adjacent modular unit, an adjacent end cap, or an adjacent mounting structure. The modular heater system 400 may further include a plurality of terminal blocks 408 mounted on outer surfaces of the modular units 402, 404.

Figure 23:
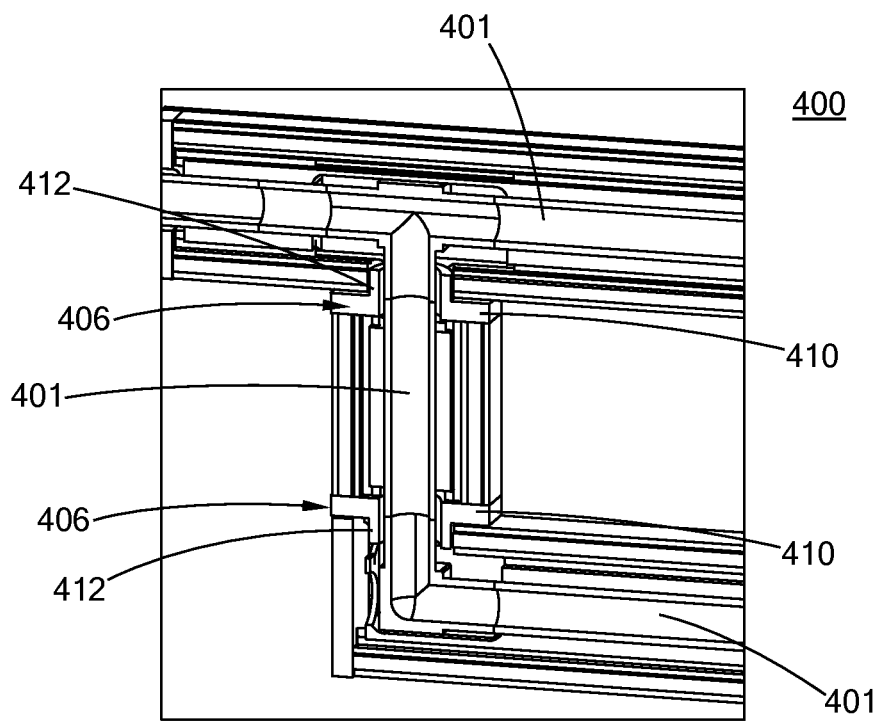
FIG. 23 is a cross-sectional view of the modular heater system and piping system of FIG. 22.

Referring to FIG. 23, the end caps 406 each include a plate portion 410 and a protrusion 412 extending vertically from the plate portion 410. The plate portion 410 may be mounted to a longitudinal end surface of a second modular unit 404. The protrusion 412 may fit into a corresponding recess in a thermal jacket of a first modular unit 402. Therefore, the first and second modular units 402 and 404 can be connected together.

Eighth Embodiment

Figure 24:
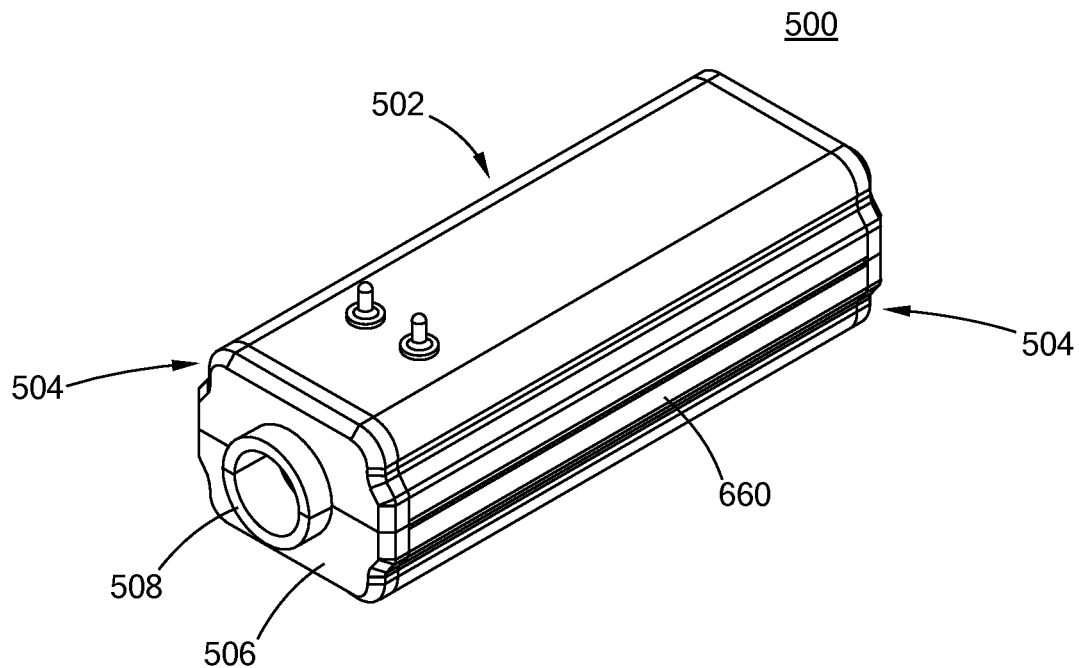
FIG. 24 is a perspective view of a modular heater system according to an eighth embodiment of the present disclosure.
Figure 25:
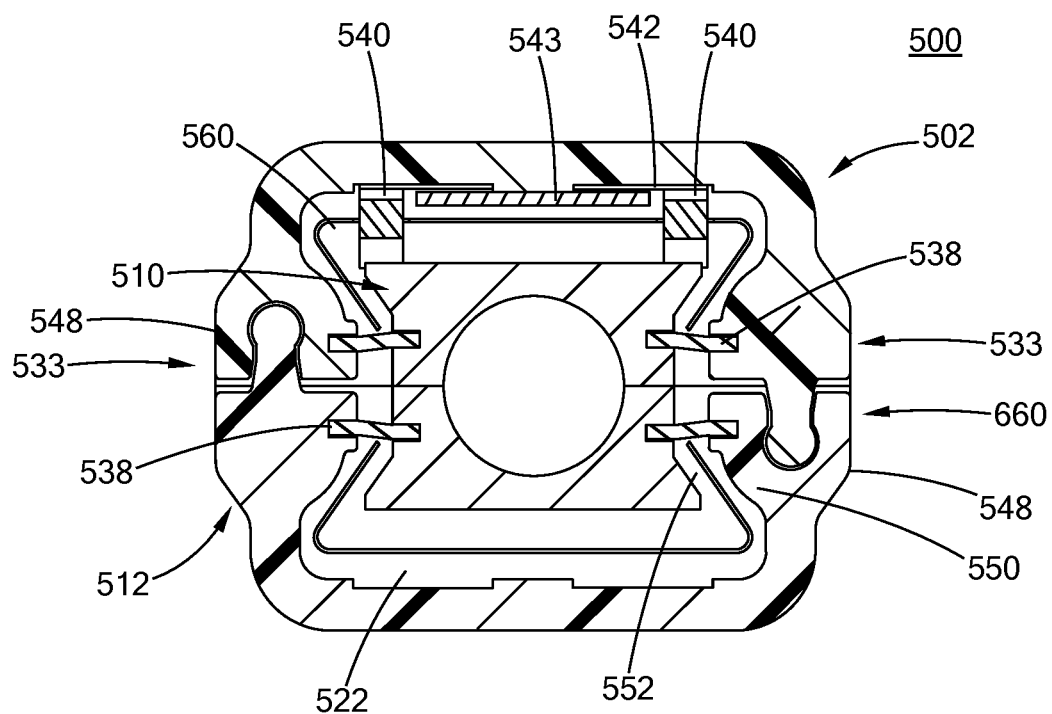
FIG. 25 is a cross-sectional view of the modular heater system of FIG. 24.

Referring to FIGS. 24 and 25, a modular heater system 500 according to an eighth embodiment of the present disclosure is structurally similar to that of FIGS. 18 and 19 except for the shape of the thermal insulation jackets and the inclusion of baffle members.

More specifically, the modular heater system 500 includes a modular unit 502 and a pair of end caps 504. The end caps 504 each include a plate portion 506 and a tubular flange 508 extending from the plate portion 506. The modular unit 502 includes a carrier member 510, a thermal insulation jacket 512, a heating element (not shown) disposed on a surface of the carrier member 510, a conducting member 540, a bus bar 542, and a plurality of shims 538. An insulation material 543 may be provided on the bus bar 542 to secure the bus bar 542 to the thermal insulation jacket 512 and to electrically insulate the bus bar 542 from the heating element. The carrier member 510 is structurally similar to that of FIG. 19 and thus the detailed description thereof is omitted herein for clarity.

The thermal insulation jacket 512 is structurally similar to the thermal insulation jacket 212 of FIG. 19 except that the free ends 533 of the upper and lower portions of the thermal insulation jacket 512 are enlarged both inwardly and outwardly such that the thermal insulation jacket 512 have a slightly convex side outer surfaces 548 and a slightly convex side inner surfaces 550. The carrier member 510 has slightly concave side outer surfaces 552 to accommodate the enlarged free ends 533 of the upper and lower portions of the thermal insulation jacket 512. The modular unit 502 further includes a baffle 560 in the form of polyimide sheet disposed in the air gap 522 to obstruct heat transfer from the carrier member 510 to the thermal insulation jacket 512. Alternately, the air gap 522 may be filled with foam or an insulator of any form to obstruct heat transfer from the carrier member 510 to the thermal insulation jacket 512.

Ninth Embodiment

Figure 26:
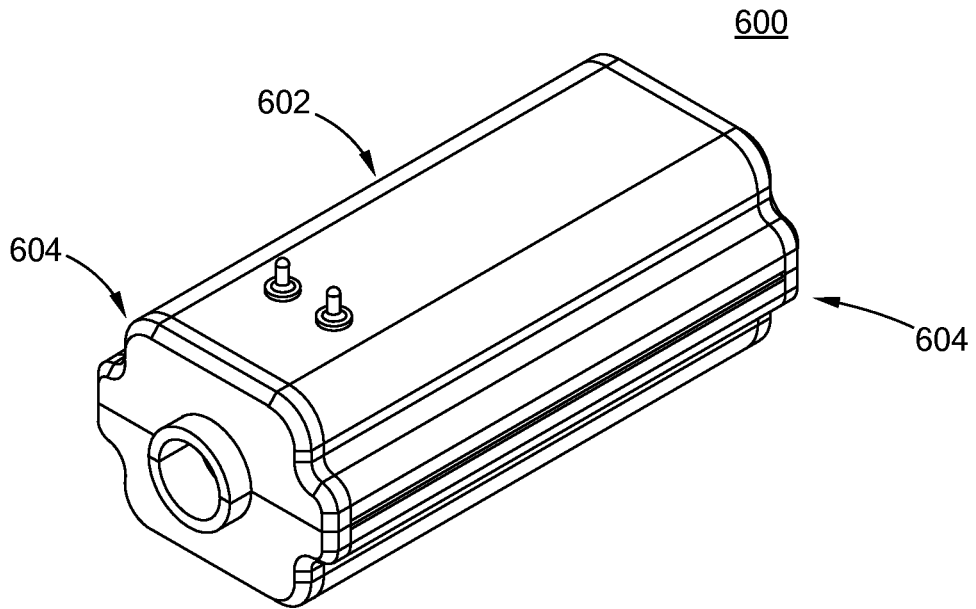
FIG. 26 is a perspective view of a modular heater system according to a ninth embodiment of the present disclosure.
Figure 27:
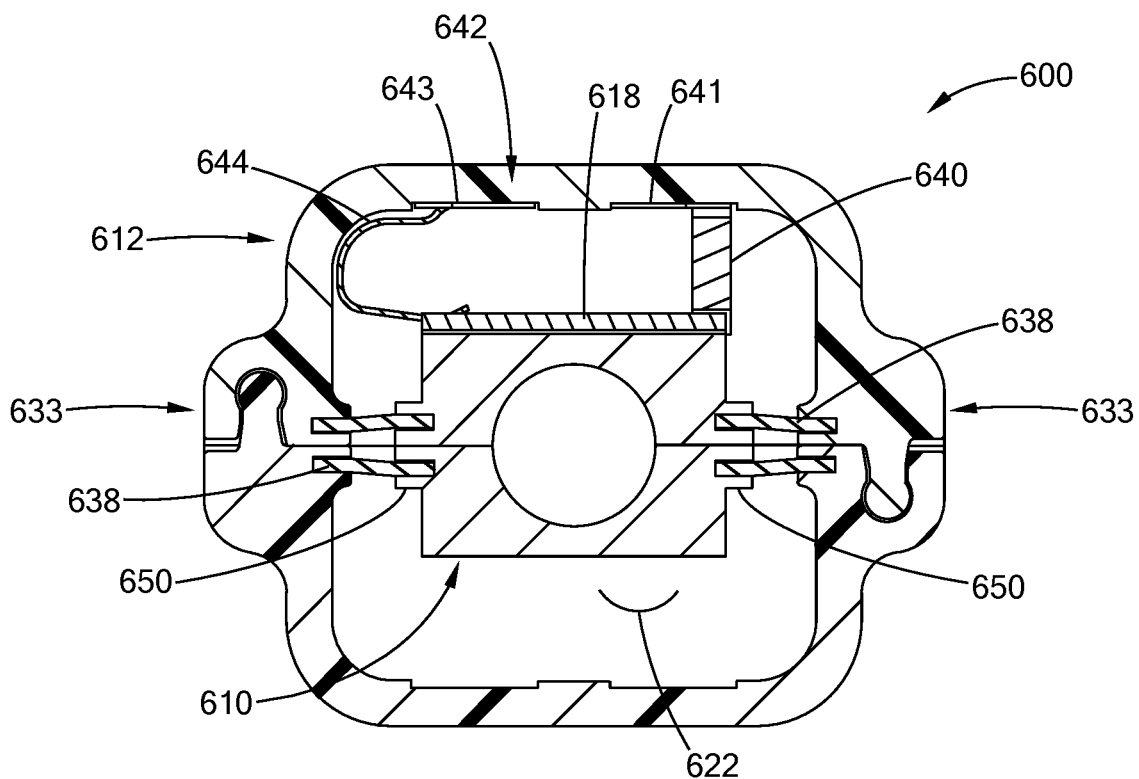
FIG. 27 is a cross-sectional view of a modular heater system of FIG. 26.

Referring to FIGS. 26 and 27, a modular heater system 600 according to a ninth embodiment of the present disclosure has a structure similar to that of the modular heater system of previous embodiments except for the shapes of the carrier member 610 and the thermal insulation jacket 612, and the form of a variant of a bus bar.

More specifically, the modular unit 600 includes a modular unit 602 and a pair of end caps 604. The modular unit 602 includes a carrier member 610, a thermal insulation jacket 612, at least one heating element 618, a conducting member 640, a first bus bar 641, a second bus bar 642. The first bus bar 641 is connected to the heating element 618 through the conducting member 640. The second bus bar 642 has a plate portion 643 and an extension portion 644. The extension portion 644 extends toward the heating element 618, is directly connected to the heating element 618, and has a curved shape to better accommodate a dielectric material (not shown) that may be disposed between the heating element 618 and the plate portion 643 of the second bus bar 642. The carrier member 610 is structurally similar to those disclosed in FIGS. 18 to 25 except that the upper and lower pieces of the carrier member 610 each have a pair of flanges 650 protruding from side surfaces of the upper and lower pieces. A plurality of shims 638 connect the flanges of the carrier member 610 to the enlarged free ends 633 of the upper and lower portions of the thermal insulation jacket 612.

The thermal insulation jacket 612 is structurally similar to those disclosed in connection with FIGS. 18 to 25 except for the shape. The thermal insulation jacket 612 has upper and lower portions each defining a pair of free ends 633. The free ends are enlarged outwardly to define ear portions 660.

In the present embodiment, the carrier member 610 is smaller so as to provide a larger air gap 622 between the carrier member 610 and the thermal insulation jacket 612.

Terminal Boxes

Figure 28:
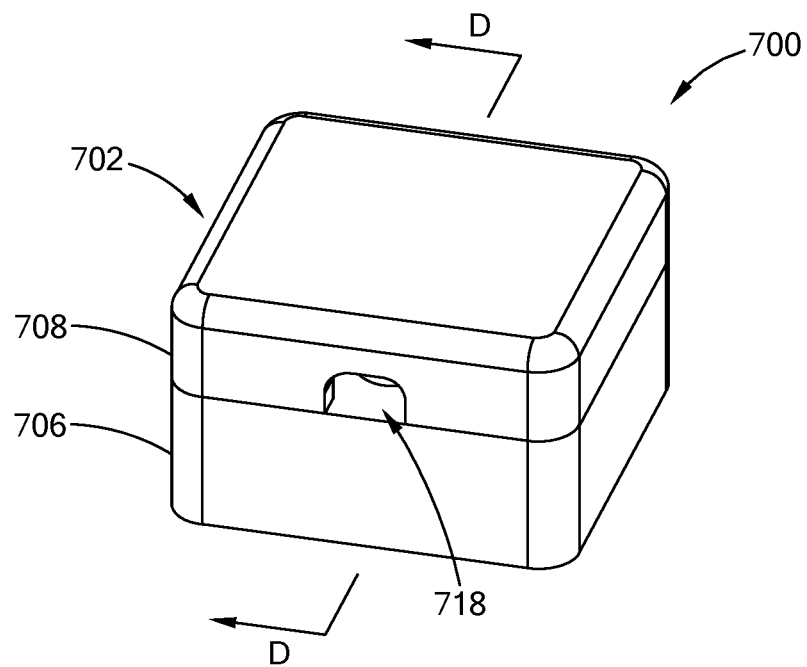
FIG. 28 is a perspective view of a terminal box shown in FIG. 22.
Figure 29:
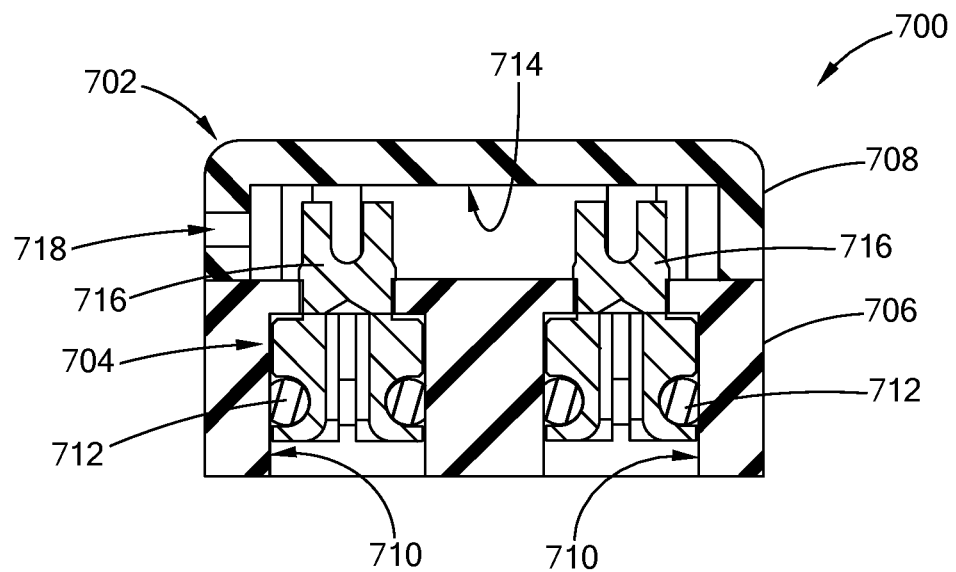
FIG. 29 is a cross-sectional view of a terminal box of FIG. 28, taken along line D-D of FIG. 28.

Referring to FIGS. 28 and 29, the terminal boxes as shown in FIG. 22 will be explained in more detail below. A terminal box 700 in a first form may include a housing 702 and electrical connectors 704 disposed inside the housing 702. The housing 702 includes a base 706 and a cover 708. The base 706 and the cover 708 can be configured to be snapped together in place, or be connected by welding or any bonding methods known in the art. The base 706 defines first cavities 710. The cover 708 defines a second cavity 714 and a side opening 718. The side opening 718 is disposed adjacent one of the electrical connectors 704. The second cavity 714 is open to the side opening 718 and the first cavities 710. The connectors 704 are disposed in the first cavities 710 with O-rings 712 provided in the first cavities 710 to center and secure the connectors 704 in the first cavities 710. The connectors 704 each have an upper end 716 protruding into the second cavity 714. Lead wires (not shown) may be disposed in the second cavity 714 to connect the upper ends 716 of the electrical connectors 704 to an external power terminal (not shown) through the side opening 718.

Figure 30:
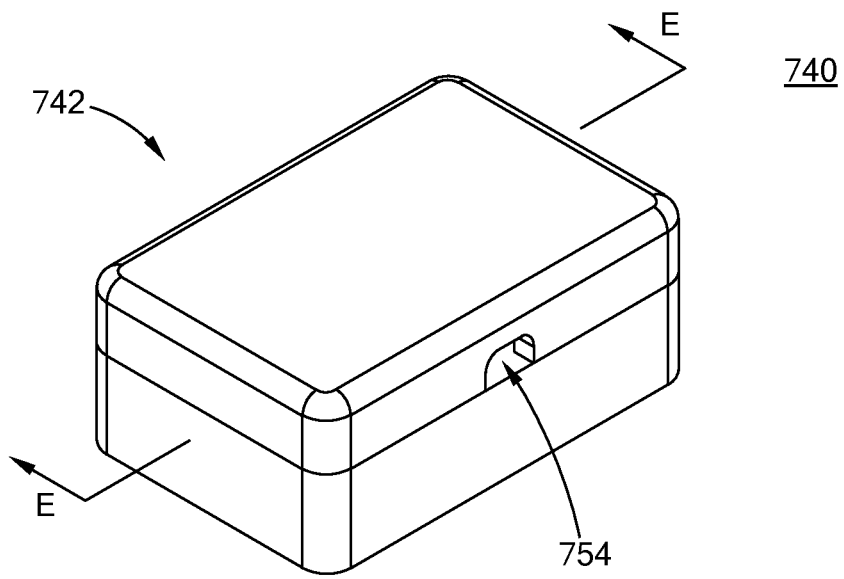
FIG. 30 is a perspective view of a variant of a terminal box.
Figure 31:
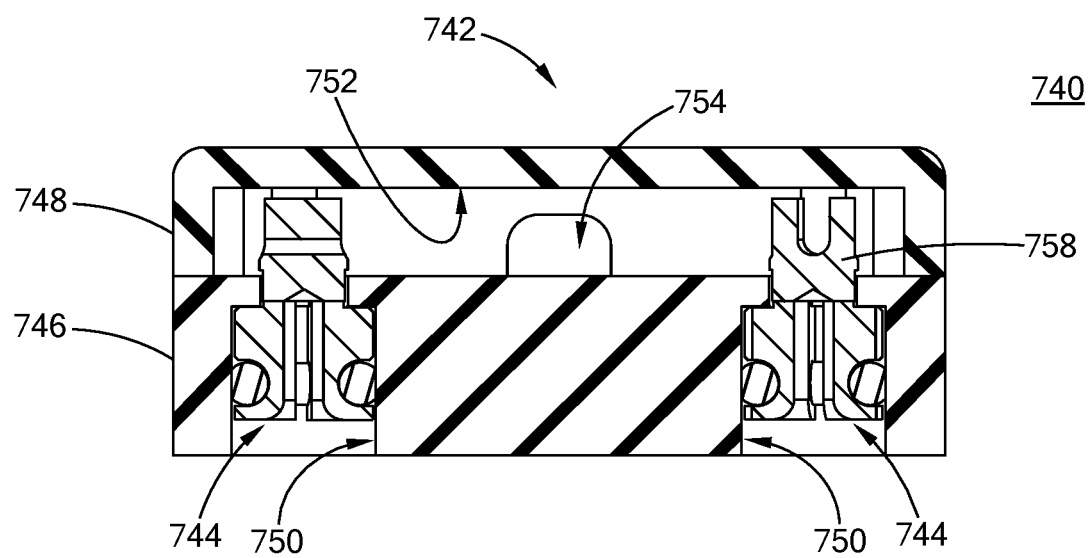
FIG. 31 is a cross-sectional view of a terminal box of FIG. 30, taken along line E-E of FIG. 30.

Referring to FIGS. 30 and 31, a variant of a terminal box 740 is shown to include a housing 742 and electrical connectors 744. The housing 742 includes a base 746 and a cover 748. The base 746 defines first cavities 750 for receiving the electrical connectors 742. The cover 748 defines a second cavity 752 and a side opening 754. The second cavity 752 is open to the first cavities 750 and the side opening 754. The electrical connectors 744 are disposed in the first cavities 750 with O-rings 756 disposed in the first cavities 750 to center and secure the electrical connectors 744 in the first cavities 750. Upper portions 758 of the electrical connectors 744 protrude into the first cavity 752. Wirings can be disposed in the second cavity 752 to engage an external power terminal through the side opening 754. The side opening 754 may be disposed between the electrical connectors 744.

Figure 32:
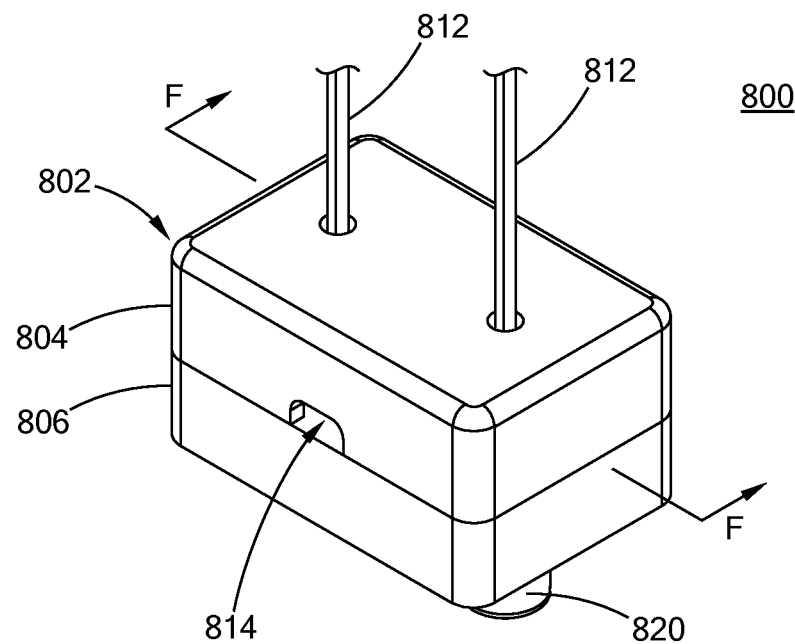
FIG. 32 is a perspective view of another variant of a terminal box, through which temperature sensors are inserted.
Figure 33:
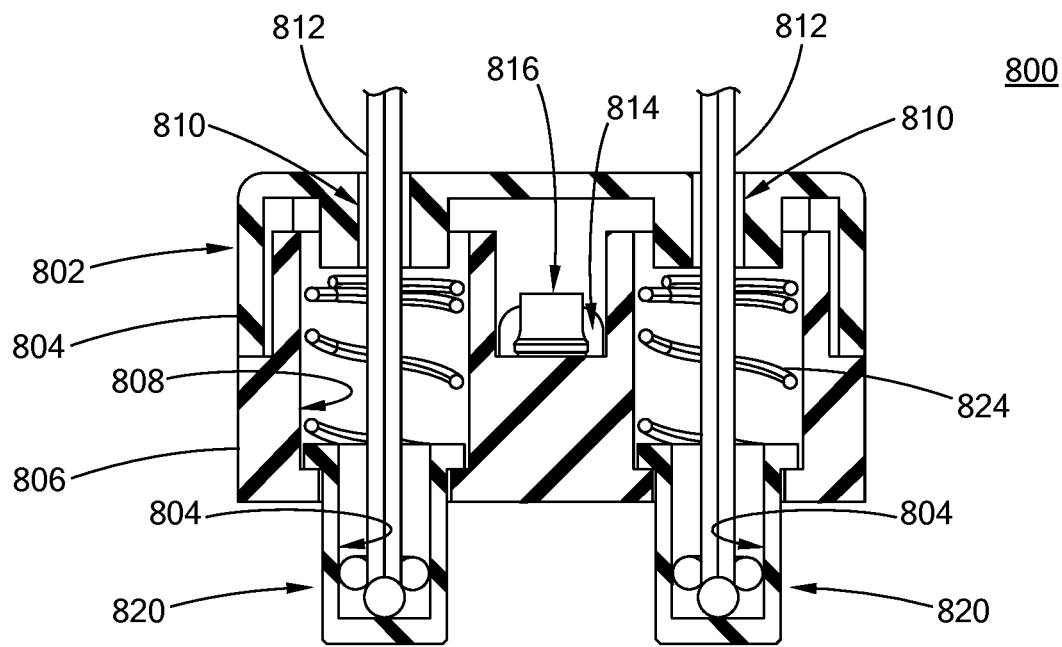
FIG. 33 is a cross-sectional view of a terminal box of FIG. 32, taken along line F-F of FIG. 32.

Referring to FIGS. 32 and 33, another variant of a terminal box 800 is structurally similar to those described in connection with FIGS. 28 to 31 except that the housing is configured to receive thermowells for receiving and protecting temperature sensors or other sensing devices such as by way of example, pressure sensors, strain sensor, and moisture sensors, among others. More specifically, the terminal box 800 include a housing 802 having a cover 804 and a base 806. The base 806 defines first cavities 808. The cover 804 defines through holes 810 corresponding to the first cavities 808 to allow for insertion of temperature sensors 812 into the first cavities 808. The temperature sensors 812 may be a thermocouple, an RTD, or a thermistor. The cover 804 defines a side opening 814 into which a conductor or a terminal 816 may be disposed. The terminal box 800 further includes a plurality of thermowells 820 inserted into the corresponding first cavities 808 for receiving and protecting ends of the temperature sensors 812. Springs 824 may be disposed in the first cavities 808 to bias the thermowells 820 against a bottom wall of the base 806.

By using the terminal boxes 700, 740, 800, the heater element (s) disposed inside the modular units may be easily connected to a power source by placing the terminal boxes on the outer surface of the modular unit and by connecting the electrical connectors of the terminal boxes to the electrical terminals 244 344 (shown in FIGS. 18-21). No wire is used inside the modular units so that mounting of the modular units around the fluid conduit can be made easy.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A modular heater system comprising:
   a plurality modular units, each including:
      a carrier member defining a receiving space for receiving a fluid conduit and side slots recessed from outer surfaces of the carrier member;
      a heating element mounted on the carrier member; and
      a thermal insulation jacket surrounding the carrier member and the heating element and including an upper half portion and a lower half portion,
   wherein the upper half portion and the lower half portion of the thermal insulation jacket each include portions extending inwardly toward the side slots of the carrier member and are self-locked in the side slots.

2. The modular heater system according to claim 1, wherein the carrier member includes an upper wall and a pair of side walls extending from the upper wall, the receiving space being jointly defined by the upper wall and the side walls.

3. The modular heater system of claim 2, wherein the upper wall of the carrier member defines a guided slot for receiving the heating element.

4. The modular heater system of claim 1, further comprising a conducting member disposed on the heating element.

5. The modular heater system of claim 4, further comprising conducing pins extending through the upper half portion of the thermal insulation jacket to engage the conducting member.

6. The heater system according to claim 1, wherein the thermal insulation jacket defines a plurality of air pockets.

7. The modular heater system according to claim 6, wherein the lower half portion further includes a protrusion extending from an inner surface of the lower half portion toward the receiving space of the carrier member.

8. The modular heater system according to claim 1, further comprising at least one alignment rod extending through longitudinal holes of the carrier members of the modular units to connect the modular units together.

9. The modular heater system according to claim 1, wherein the thermal insulation jacket includes fins extending therefrom.

10. The modular heater system according to claim 1, wherein the carrier member includes an upper piece and a lower piece, wherein the upper and lower piece jointly define the receiving space for receiving the fluid conduit.

* * * * *